US012566352B2

(12) United States Patent
Hanada et al.

(10) Patent No.: US 12,566,352 B2
(45) Date of Patent: Mar. 3, 2026

(54) DISPLAY DEVICE

(71) Applicant: Japan Display Inc., Tokyo (JP)

(72) Inventors: Akihiro Hanada, Tokyo (JP); Takuo Kaitoh, Tokyo (JP); Motochika Yukawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/910,103

(22) Filed: Oct. 9, 2024

(65) Prior Publication Data

US 2025/0147369 A1 May 8, 2025

(30) Foreign Application Priority Data

Nov. 2, 2023 (JP) ................................. 2023-188730

(51) Int. Cl.
*G02F 1/1368* (2006.01)
*G02F 1/1362* (2006.01)

(52) U.S. Cl.
CPC ...... *G02F 1/1368* (2013.01); *G02F 1/136209* (2013.01); *G02F 1/136227* (2013.01); *G02F 1/136286* (2013.01)

(58) Field of Classification Search
CPC ............. G02F 1/1368; G02F 1/136209; G02F 1/136227
See application file for complete search history.

(56) References Cited

U.S. PATENT DOCUMENTS 5,541,748 A * 7/1996 Ono ..................... H10D 86/441
349/138
2020/0127011 A1 4/2020 Yamazaki et al.
2022/0004052 A1 1/2022 Ohue

FOREIGN PATENT DOCUMENTS

JP 2020160254 A 10/2020
WO 2018130920 A1 7/2018

* cited by examiner

*Primary Examiner* — Lucy P Chien
(74) *Attorney, Agent, or Firm* — Maier & Maier, PLLC

(57) ABSTRACT
A display device includes a first pixel including a transistor having an oxide semiconductor layer, a first gate wiring, and a first source wiring. The first gate wiring includes a first part of a first conductive, and extends in a first direction. The first source wiring includes a first part of a second conductive layer and a first part of a third conductive layer connected to the first part of the second conductive layer, and extends in a second direction intersecting the first direction. A thickness of the second conductive layer is thinner than a thickness of the first conductive layer and thinner than a thickness of the third conductive layer.

7 Claims, 12 Drawing Sheets

FIG. 2

DISPLAY DEVICE

CROSS-REFERENCE TO RELATED APPLICATIONS

This application claims the benefit of priority to Japanese Patent Application No. 2023-188730 filed on Nov. 2, 2023, the entire contents of which are incorporated herein by reference.

FIELD

An embodiment of the present invention relates to a display device.

BACKGROUND

In recent years, a transparent display in which it is possible to visually recognize the background of a surface on the opposite side from another surface has been developed. The transparent display includes, for example, a plurality of pixels including a common electrode and a transistor each electrically connected to a pixel electrode, and can display an image, characters, and the like according to a difference in potential supplied to the common electrode and the pixel electrode. The transparent display is a display capable of realizing a wide viewing angle without using a polarizing plate.

SUMMARY

A display device according to an embodiment of the present invention includes an oxide semiconductor layer, a first gate wiring, and a first source wiring. The first gate wiring includes a first part of a first conductive, and extends in a first direction. The first source wiring includes a first part of a second conductive layer and a first part of a third conductive layer connected to the first part of the second conductive layer, and extends in a second direction intersecting the first direction. A thickness of the second conductive layer is thinner than a thickness of the first conductive layer and thinner than a thickness of the third conductive layer.

BRIEF DESCRIPTION OF DRAWINGS

FIG. 2 is a cross-sectional view showing a cross-sectional configuration of the display device taken along a line A1-A2 shown in FIG. 1.

DESCRIPTION OF EMBODIMENTS

Figure 1:
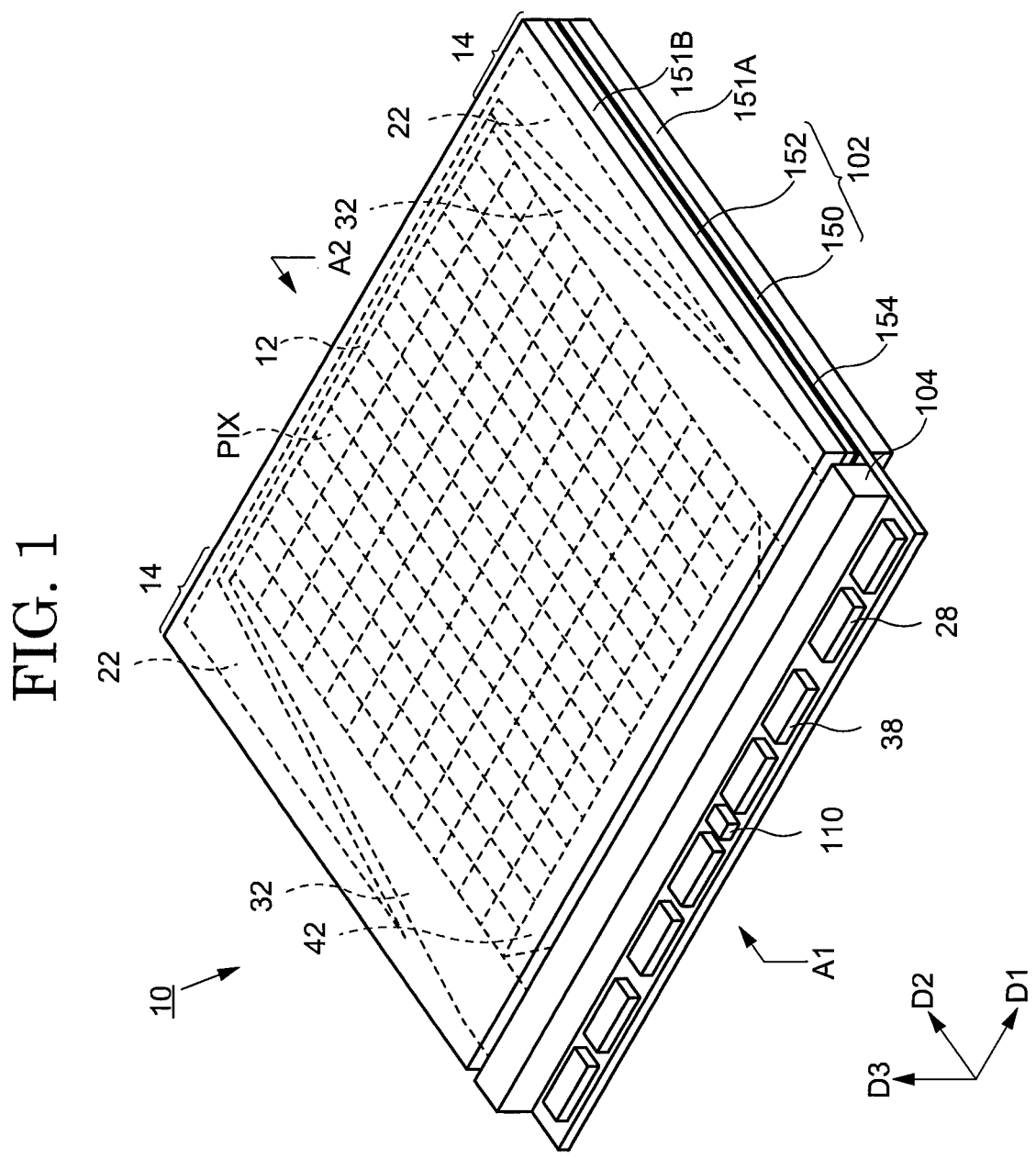
FIG. 1 is a perspective view showing a configuration of a display device according to an embodiment of the present invention.

Hereinafter, an example of a display device capable of suppressing deterioration in electrical characteristics according to each embodiment of the present invention will be described with reference to the drawings and the like. However, the present invention can be implemented in many different aspects, and should not be construed as being limited to the description of the embodiments exemplified below. Further, in order to make the description of each embodiment of the present invention clearer, the width, thickness, shape, and the like of each portion shown in the drawings may be schematically represented in comparison with the actual aspects, but the schematic drawings are merely examples, and do not limit the interpretation of the present invention. Furthermore, in the present specification and the drawings, elements that are the same as or similar to those shown and described in the previous drawings are denoted by the same reference signs, and redundant description may be omitted. In addition, in the present specification and the drawings, when a plurality of components that are the same or similar to each other are separately described, they may be described as -1, -2, or the like. Uppercase or lowercase letters of the alphabet may be used. In this specification and the drawings, the terms "first" and "second" with respect to each element are convenient signs used to distinguish each element, and do not indicate a priority order or an order.

In the present invention, in the case where a single film is processed to form a plurality of films, the plurality of films may have different functions and roles. However, the plurality of films are derived from films formed as the same layer in the same process, and have the same layer structure and the same material. Therefore, the plurality of films is defined as being present in the same layer. In addition, in the case where the plurality of films are formed by processing a certain film, in the present specification and the like, there are cases where the films are described separately as -1, -2, and the like.

In addition, in this specification and the drawings, expressions such as "up" and "down" represent relative positional relationships between a structure of interest and other structures. In this specification and each of the drawings, in the case where a cross-sectional structure of a structure of interest is described, a direction from a first substrate to a pixel electrode, which will be described later, is defined as "upper", and a direction from the pixel electrode to the first substrate is defined as "lower". In the present specification and claims, the expression "above" in describing a manner of placing another structure on a structure includes both the case of placing another structure directly on the structure so as to be in contact with the structure and the case of placing another structure above the structure, with another structure in between, unless otherwise specified.

Further, in the present specification and the like, a bottom gate drive is a drive for controlling on/off of a transistor to be described later by using a gate electrode arranged below a semiconductor layer to be described later. Further, in this specification and the like, a top gate drive is a drive for controlling on/off of the transistor by using a gate electrode arranged above the semiconductor layer. Further, in the present specification, a dual gate drive is a drive that supplies the same control signal to the gate electrodes arranged above and below the semiconductor layer to control on/off of the transistor.

In the detailed description of the present invention, in the case of using the notations identical, same, parallel, and vertical designations, the identical, same, parallel, and vertical may include cases where errors within the scope of the design are included.

The transistor made of the oxide semiconductor includes a gate electrode, a source electrode, and a drain electrode. For example, in a manufacturing process of the transistor including the oxide semiconductor as a material, when a conductive layer for forming the source electrode and the drain electrode is formed, an oxide semiconductor layer including the oxide semiconductor is damaged. As a result, electrical characteristics of the transistor made of the oxide semiconductor are deteriorated, and the display quality of the display device is deteriorated.

Details will be described in the following embodiments with reference to FIG. 1 to FIG. 12. An embodiment of the present invention is the display device 10 including a display panel 102 (see FIG. 1) using polymer dispersed liquid crystal. The display device 10 includes a pixel PIX (first pixel) having an oxide semiconductor layer 204 (see FIG. 7, an oxide semiconductor as a semiconductor material), a gate wiring GL (see FIG. 4, a first gate electrode and a first gate wiring connected to the first gate electrode), a conductive layer 206-4 (see FIG. 7, a first source electrode), and a transistor Tr (see FIG. 4) including a source wiring SL (see FIG. 4, a first source wiring), and includes a plurality of pixels PIX (see FIG. 1) arranged in a matrix in a direction D1 (see FIG. 1) and a direction D2 (see FIG. 1). Further, the display device 10 is provided on a first surface 150a (see FIG. 7) of an array substrate 150 (see FIG. 7), and includes a conductive layer 202 (see FIG. 7, a first conductive layer) including the gate wiring GL of the transistor Tr. In addition, the display device 10 includes the oxide semiconductor layer 204 (see FIG. 7) overlapping the conductive layer 202 and including an oxide semiconductor provided on the conductive layer 202. In addition, the display device 10 includes the conductive layer 206-4, a conductive layer 208-3, and a conductive layer 208-4 (see FIG. 10, a second conductive layer and a third conductive layer) which are in contact with the oxide semiconductor layer 204 and include the source wiring SL of the transistor Tr provided on the oxide semiconductor layer 204 in a plan view. A film thickness of a conductive layer 206 of the present embodiment is thinner than a film thickness of a conductive layer 208 and thinner than a film thickness of the conductive layer 202. In addition, although the thickness of the conductive layer 206 of the present embodiment is as thin as a film thickness of the oxide semiconductor layer 204, the thickness of the conductive layer 206 is not limited to the configuration of the present embodiment. For example, the film thickness of the conductive layer 206 may be thinner than the film thickness of the oxide semiconductor layer 204, and the film thickness of the conductive layer 206 may be thicker than the film thickness of the oxide semiconductor layer 204. The thickness of the conductive layer 206 can be appropriately changed according to the specifications and applications of the display device 10.

For example, since the conductive layer 206 including the drain electrode and the source wiring SL of the transistor Tr spaced apart from each other on the oxide semiconductor layer 204 is included, and the thickness of the conductive layer 206 is thinner than the thickness of the conductive layer 206 and a thickness of the conductive layer 208, damages to the oxide semiconductor layer 204 including the oxide semiconductor is alleviated in the manufacturing process of the display device 10 as compared with the case where the source wiring SL and the drain electrode are formed (patterned) using the conductive layer having a thick film such as the conductive layer 206 and the conductive layer 208. In addition, the source wiring SL includes the conductive layer 208 that is thicker than the thickness of the conductive layer 206 and the thickness of the oxide semiconductor layer 204, and can be used as a wiring for routing the conductive layer 208 in a display area 12.

As a consequence, the degradation of the electric properties of the transistor Tr of the display device 10 is suppressed, and degradation of the display quality of the display device 10 can be suppressed. In addition, since the source wiring SL is formed using the conductive layer 206 and the conductive layer 208 and resistivity of the source wiring SL can be reduced, it is possible to reduce a delay of a signal.

Each of the embodiments described below exemplifies a display device capable of suppressing deterioration in characteristics of a transistor. Further, the display device 10 according to an embodiment of the present invention will be described with reference to FIG. 1 to FIG. 12. As an example, the display device 10 according to an embodiment of the present invention is a transparent display, and a display panel included in the display device 10 is a display panel using polymer dispersed liquid crystal.

Overview of Display Device 10

Figure 2:
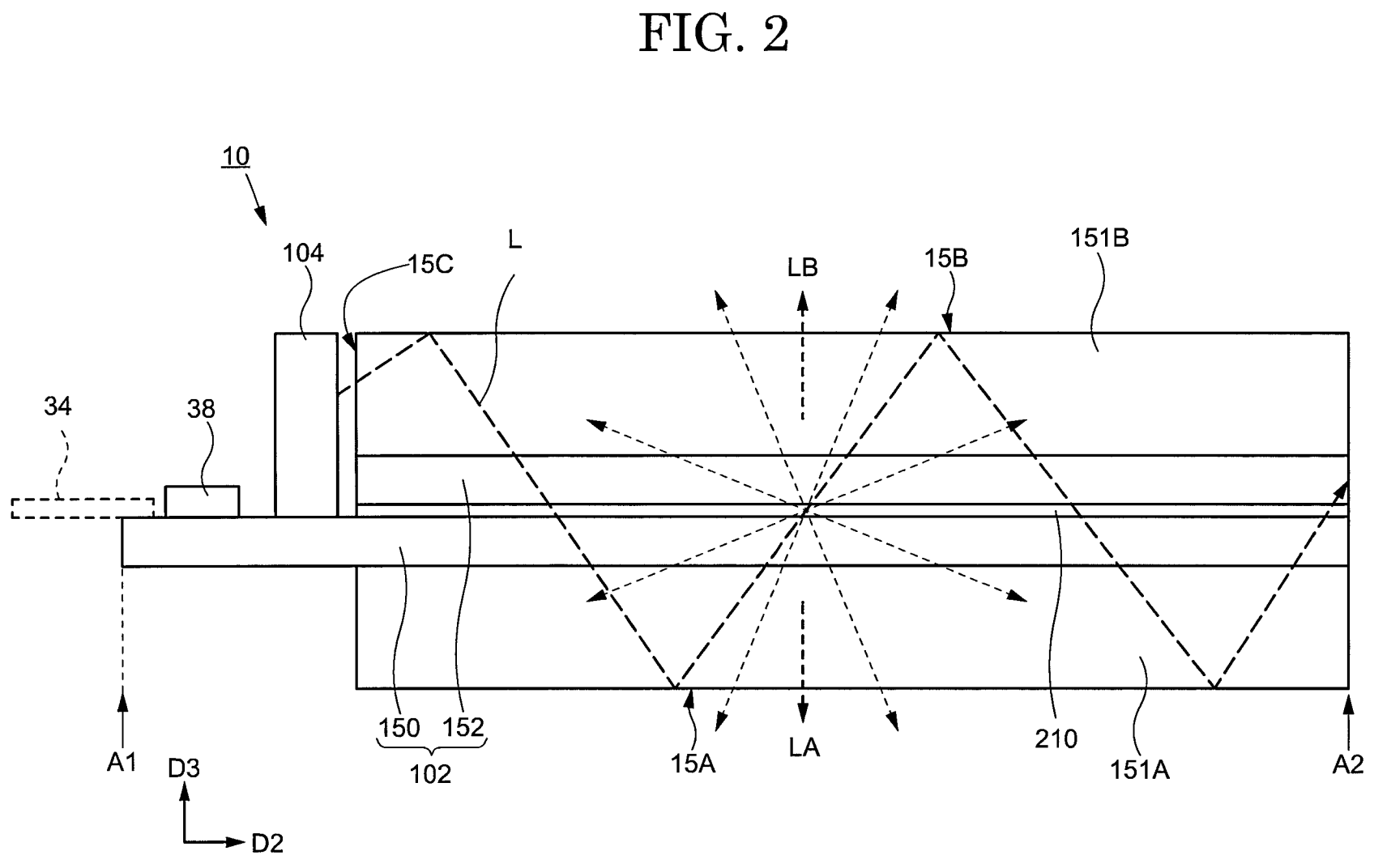
Figure 3:
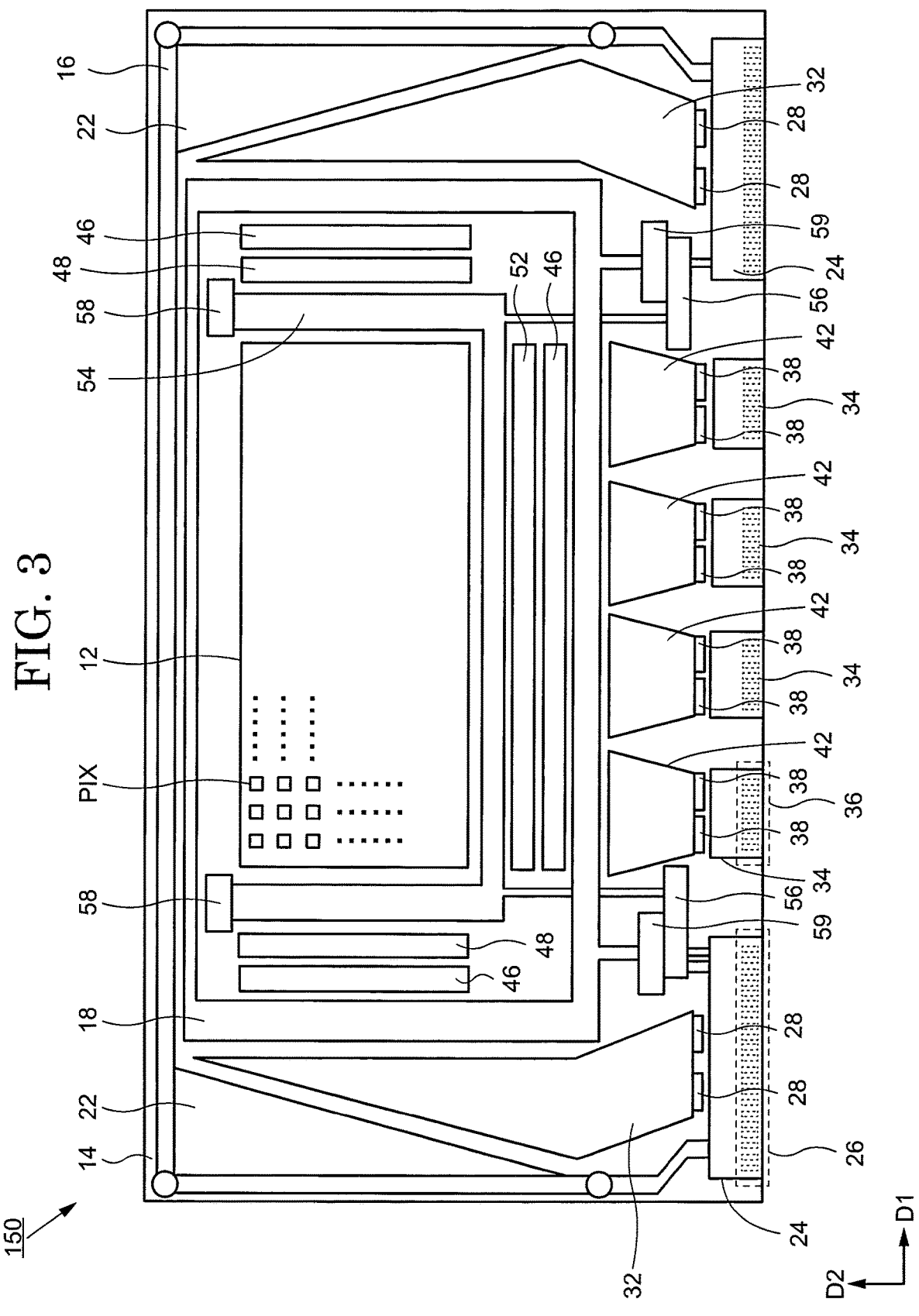
FIG. 3 is a plan view showing a configuration of a display device according to an embodiment of the present invention.

An outline of the display device 10 will be described with reference to FIG. 1 to FIG. 3. FIG. 1 is a perspective view showing a configuration of the display device 10. FIG. 2 is a cross-sectional view showing a cross-sectional configuration of the display device taken along a line A1-A2 shown in FIG. 1. FIG. 3 is a plan view showing a configuration of the array substrate 150 of the display device 10.

As shown in FIG. 1, FIG. 2, or FIG. 3, the display device 10 includes the display panel 102 including the array substrate 150, an opposing substrate 152, and a liquid crystal layer (not shown) between the array substrate 150 and the opposing substrate 152, a gate drive circuit 28, and a source drive circuit 38, a light source 104, and a first transparent substrate 151A and a second transparent substrate 151B sandwiching the display panel 102.

In the display device 10, one direction of a plane of the display panel 102 is the direction D1, the direction orthogonal to direction D1 is the direction D2, and a direction orthogonal to a plane D1-D2 is a direction D3. The array substrate 150 of the display device 10 may be referred to as a first substrate, and the opposing substrate 152 of the display device 10 may be referred to as a second substrate.

The display panel 102 has the display area 12 and a peripheral area 14 outside the display area 12. The display area 12 and the peripheral area 14 overlap the array substrate 150 and the opposing substrate 152. The display area 12 includes a plurality of pixels PIX. The plurality of pixels PIX are arranged in a matrix in a row direction and a column direction. Each of the plurality of pixels PIX includes a plurality of transistors and a liquid crystal device. For example, the row direction may refer to a direction parallel to the direction D1, and the column direction may refer to a direction parallel to the direction D2. In the display area 12, m pixels (m is a positive integer) are arranged in the row direction, and n pixels (n is a positive integer) are arranged in the column direction. The numerical values m and n are appropriately set according to the display resolution in a vertical direction and the display resolution in a horizontal direction. In the display area 12, the gate wiring is arranged in the direction D1 and the source wiring is arranged in the direction D2. The gate wiring may be referred to as a scanning signal wiring, and the source wiring may be referred to as a data signal wiring.

The peripheral area 14 is provided so as to surround the display area 12. In addition, the peripheral area 14 refers to an area from the display area 12 to an end portion of the array substrate 150 in the array substrate 150. In other words, the peripheral area 14 refers to an area other than an area where the display area 12 is provided on the array substrate 150 (that is, an area outside the display area 12).

The gate drive circuit 28 and the source drive circuit 38 are provided in the peripheral area 14 overlapping the array substrate 150. For example, the gate drive circuit 28 and the source drive circuit 38 are provided in an integrated circuit (IC) and are mounted in a COG (Chip on Glass) method on the array substrate 150. Further, for example, the gate drive circuit 28 and the source drive circuit 38 may be implemented by a COF (Chip on Film) method, or may be formed by a thin film transistor (TFT: Thin Film Transistor) formed on the array substrate 150.

As shown in FIG. 3, a gate wiring area 32, a source wiring area 42, common wirings 16 and 18, terminal portions 26 and 36, flexible printed circuits 24 and 34, and various inspection circuits are provided in the peripheral area 14. The terminal portions 26 and 36 are arranged along one side of the array substrate 150.

The gate wiring area 32 is an area in which a pattern formed by a wiring connecting the gate drive circuit 28 and the gate wiring GL arranged in the display area 12 is provided. A common wiring area 22 is an area in which a pattern formed by a common wiring is provided. The common wiring area 22 is used as a wiring for applying a common voltage to a common electrode 218 (see FIG. 7) provided on the opposing substrate 152 in the circuit. The source wiring area 42 is an area in which a pattern formed by a wiring connecting the source drive circuit 38 and the source wiring SL arranged in the display area 12 is provided. For example, the common voltage may be a voltage between a voltage of a positive-side voltage amplitude and a voltage of a negative-side voltage amplitude among voltages supplied to the source wiring SL, may be a voltage serving as a reference of the voltage amplitude, may be 0 V, or may be a ground voltage.

The flexible printed circuit 24 is connected to the terminal portion 26. The flexible printed circuit 24 supplies various signals to the gate drive circuit 28, the common wires 16 and 18, an ESD protection circuit 59, and a QD pad 56. The gate driver 28 is connected to a plurality of gate wirings GL, and each of the plurality of gate wirings GL (see FIG. 4) is electrically connected to each of the plurality of pixels PIX in the display area 12. In FIG. 3, an area in which the plurality of gate wirings GL are provided is represented as the gate wiring area 32, and a detailed arrangement of the plurality of gate wirings GL is omitted. The number of gate wirings GL connected to two gate driver circuits 28 corresponds to the number of rows of the pixels PIX in the display area 12. In addition, although a structure of the gate wiring area 32 shown in FIG. 3 is separated from the display area 12, the gate wirings GL are actually electrically connected to the pixels PIX.

The flexible printed circuit 34 provides a data signal to the source drive circuit 38. The source drive circuit 38 is connected to a plurality of source wirings SL (see FIG. 4), and each of the plurality of source wirings SL is electrically connected to each of the plurality of pixels PIX in the display area 12. In FIG. 3, an area in which the plurality of source wirings SL is provided is represented as the source wiring area 42, and a detailed arrangement of the plurality of source wirings SL is omitted. The number of source wirings SL connected to eight source drive circuits 38 corresponds to at least three times the number of columns of the pixels PIX in the display area 12. The number of the source wirings SL of the display device 10 is four times the number of columns of the pixels PIX in the display area 12. In addition, although a configuration of the source wiring area 42 shown in FIG. 3 is spaced apart from the display area 12, the source wirings SL and the pixels PIX are actually electrically connected to each other.

The common wiring 18, the ESD protection circuit 46, a gate inspection circuit 48, and an inspection wiring 54 are provided between the gate wiring area 32 and the display area 12. The common wiring 18, the ESD protection circuit 46, a source inspection circuit 52, and the inspection wiring 54 are provided between the source wiring area 42 and the display area 12. The inspection wiring 54 is connected to an ESD protection circuit 58 and the QD pad 56. The common wiring 18 is connected to the ESD protection circuit 59.

The common wiring 18 is provided so as to surround the peripheral area 14 of the array substrate 150, and is supplied with signals from the two flexible printed circuits 24. Further, the common wiring 16 is electrically connected to the mesh-shaped common wiring area 22.

As shown in FIG. 1 or FIG. 2, the array substrate 150 is larger than the opposing substrate 152, and a part of the peripheral area 14 overlapping the array substrate 150 is exposed from the opposing substrate 152. Further, the flexible printed circuit 34 is attached to a peripheral portion of the array substrate 150. The opposing substrate 152 is arranged to face the array substrate 150 in the direction D3. The array substrate 150 and the opposing substrate 152 are bonded to each other by a sealing material 154 in a state of being arranged so as to face each other with a gap therebetween. The array substrate 150 and the opposing substrate 152 have light transmitting properties. The array substrate 150 and the opposing substrate 152 are preferably transparent to visible light.

As shown in FIG. 1 or FIG. 2, the light source 104 has a structure along the direction D1. For example, the light source 104 includes light emitting diodes (LED: Light Emitting Diode) arranged along the direction D1. The light source 104 is not limited to a light emitting diode, and may include an optical member such as a reflector, a diffuser, or lenses in addition to the light emitting diodes arranged in the direction D1. The light source 104 and a light emission control circuit 110 for controlling the light source 104 may be provided as separate members independent of the display panel 102. In addition, in the light source 104 may be configured such that a timing of light emission is controlled by the light emission control circuit 110 synchronized with the gate drive circuit 28 and the source drive circuit 38. The light emission control circuit 110 for controlling the light source 104 may be provided as a separate member as the light source 104 separately from the display panel 102, may be mounted on the array substrate 150 as a separate component, and may be incorporated in the gate drive circuit 28 or the source drive circuit 38.

The light source 104 is arranged adjacent to one side surface of the first transparent substrate 151A or the second transparent substrate 151B. For example, as shown in FIG. 1 or FIG. 2, the light source 104 is arranged along one side surface (a first side surface 15C) of the second transparent board 151B. Further, although FIG. 2 shows a configuration in which the light source 104 is attached to the array substrate 150, the method or structure for attaching the light source 104 to the array substrate 150 is not limited to the configuration shown in FIG. 2. As long as the light source 104 can be fixed to the second transparent substrate 151B, there is no limitation on the method or configuration of attaching the light source 104 to the array substrate 150. For example, the light source 104 may be supported by a housing surrounding the display panel 102 and attached to the array substrate 150. In addition, the light source 104 may be referred to as a side light source because it irradiates the first side surface 15C of the second transparent board 151B with a light L. In this case, the first side surface 15C of the second transparent board 151B facing the light source 104 serves as a light incidence surface.

As shown in FIG. 1 and FIG. 2, the first transparent substrate 151A and the second transparent substrate 151B are provided so as to sandwich the display area 12 and the peripheral area 14. The first transparent substrate 151A and the second transparent substrate 151B function as protection members of the display panel 102. Further, the first transparent substrate 151A and the second transparent substrate 151B have functions as a light guide plate for introducing the light emitted from the light source 104 into the display panel 102.

As shown in FIG. 2, the first transparent substrate 151A is provided on a side of the array substrate 150, and the second transparent substrate 151B is provided on a side of the opposing substrate 152. The first transparent substrate 151A and the second transparent substrate 151B preferably have refractive indices equivalent to those of the array substrate 150 and the opposing substrate 152. For example, the array substrate 150 and the first transparent substrate 151A, and the opposing substrate 152 and the second transparent substrate 151B are bonded to each other with a transparent adhesive (not shown).

The light L incident on the first side surface 15C of the second transparent substrate 151B propagate in a direction away from the first side surface 15C (the direction D2) while being reflected by a second plane 15B of the second transparent substrate 151B and a first plane 15A of the first transparent substrate 151A. When the light L is directed to the outside from the first plane 15A of the first transparent substrate 151A and the second plane 15B of the second transparent substrate 151B, the light L proceeds from a medium having a large refractive index to a medium having a small refractive index. At this time, if an incident angle of the light L incident on the first plane 15A and the second plane 15B is larger than a critical angle, the light L is totally reflected, and is guided to the direction D2 while being reflected by the first plane 15A and the second plane 15B.

For example, a liquid crystal layer 210 includes polymer dispersed liquid crystal. The polymer dispersed liquid crystal includes bulk and fine particles. For example, the ordinary refractive indices of the bulk and the fine particles are equal to each other. Orientation of the fine particles changes according to a potential difference between a potential supplied to a pixel electrode 216 (see FIG. 7) and a potential supplied to the common electrode 218 (see FIG. 7) in the bulk. The plurality of pixels PIX of the display device 10 are individually controlled with respect to the potential supplied to the pixel electrodes 216 for each pixel PIX. That is, in the plurality of pixel PIX of the display device 10, at least degrees of light transmission and distribution are controlled for each pixel PIX. A scattering degree of the liquid crystal layer (fine particles) 210 is controlled in accordance with the potential supplied to each pixel electrode 216 and the potential supplied to the common electrode 218. Between the pixel electrode 216 to which the potential is supplied and the common electrode 218 to which the potential is supplied, an optical axis of the fine particles is inclined by an electric field generated between the pixel electrode 216 and the common electrode 218. Since an optical axis of the bulk does not change depending on the electric field, the optical axis of the bulk and the optical axis of the fine particles are different from each other. In a state in which a potential difference is generated between the pixel electrode 216 and the common electrode 218, the liquid crystal layer 210 is in a scattering state in which light emitted from the light source 104 is scattered. Therefore, as shown in FIG. 2, for example, in the case where there is a pixel PIX in which the liquid crystal layer 210 is scattered, at least a part of the light L propagating while being reflected by the first plane 15A and the second plane 15B is scattered. Consequently, the incident angle of the scattered light becomes an angle smaller than the critical angle, and each of the scattered lights LA and LB is emitted to the outside from the first surface 150a (see FIG. 7) of the array substrate 150 and a first surface 152a (see FIG. 7) of the opposing substrate 152, that is, the first plane 15A and the second plane 15B. For example, when a data signal is supplied to the source wiring SL of the pixel PIX and a potential based on the data signal is supplied to the pixel electrode 216, the liquid crystal layer 210 (polymer dispersed liquid crystal) becomes scattered, the display device 10 displays an image based on the data signal on the display panel 102, and a viewer can visually recognize the image together with the background. On the other hand, in a state in which no potential difference is generated between the pixel electrode 216 and the common electrode 218, a refractive index difference between the bulk and the fine particles becomes zero in all directions. At this time, the liquid crystal layer 210 is in a non-scattering state in which the light L emitted from the light source 104 is not scattered. For example, the light emitted from the light source 104 propagates away from the light source 104 (light emitting unit) while being reflected by the first surface 150a (see FIG. 7) of the array substrate 150 and the first surface 152a (see FIG. 7) of the opposing substrate 152. When there is a non-scattered pixel PIX, the light L is transmitted through the first plane 15A and the second plane 15B. As a result, the viewer can visually recognize the background on the side of the opposing substrate 152 from the side of the array substrate 150, and can visually recognize the background on the side of the array substrate 150 from the side of the opposing substrate 152.

The display panel 102 of the display device 10 is not limited to a panel such as a transparent display including a polymer dispersed liquid crystal. The display panel 102 of the display device 10 may be applied to a large panel that is not a transparent display.

Pixel Circuit

Figure 4:
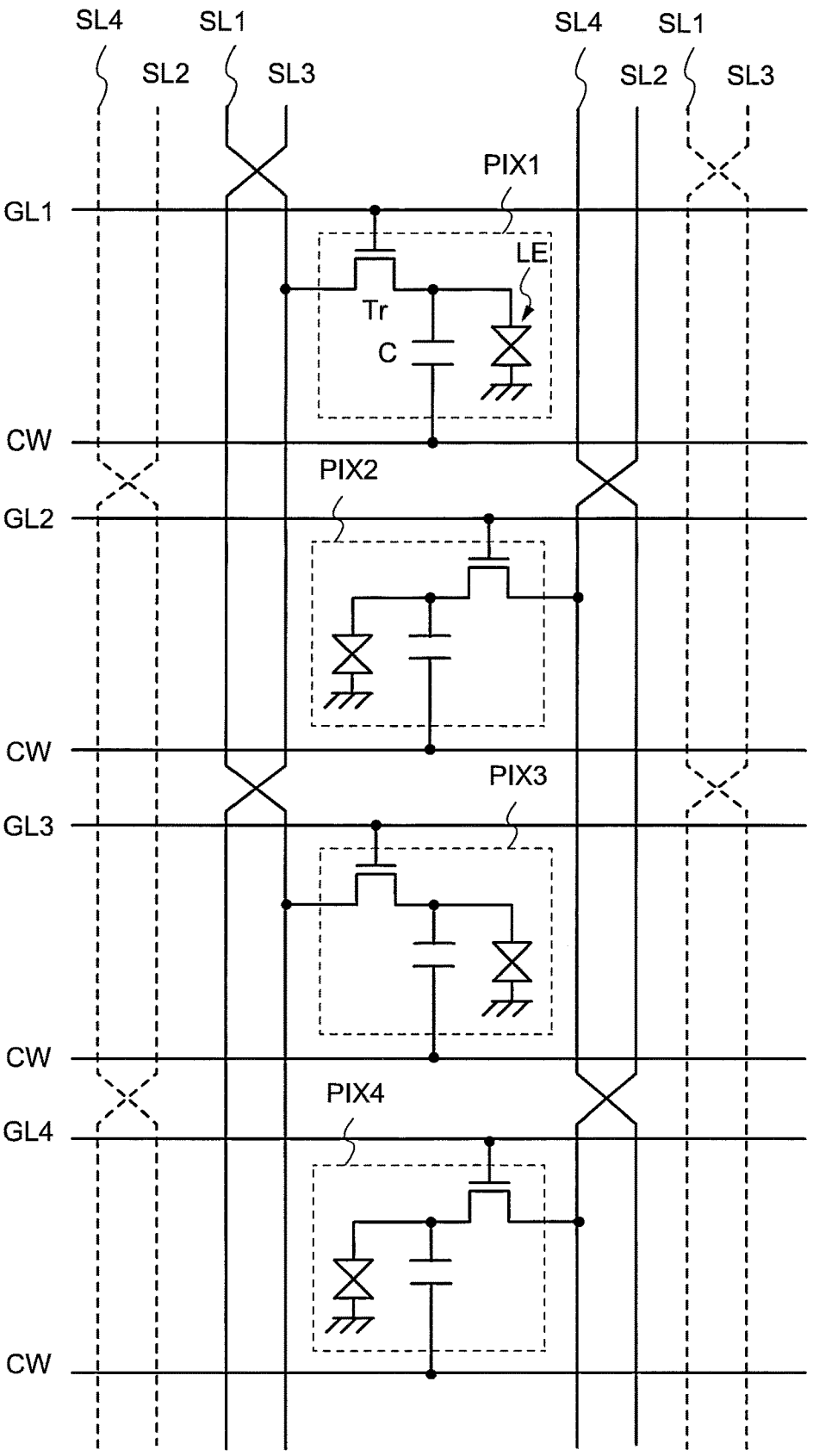
FIG. 4 is a circuit diagram showing a circuit configuration of a pixel according to an embodiment of the present invention.

An outline of a pixel circuit included in the display device 10 will be described with reference to FIG. 4. FIG. 4 is a circuit diagram showing a circuit configuration of the pixel PIX. Configurations that are the same as or similar to the configurations in FIG. 1 to FIG. 3 will be described as necessary.

For example, the display device 10 can simultaneously supply the on-voltage to the four gate wirings GL, and simultaneously charge the four pixels PIX arranged in a column direction by the four source wirings SL. As a result, the scanning time of the wirings connected to all the pixels arranged in the display area 12 is shortened. Therefore, in a panel such as a transparent display or a large panel, the charge duration of the pixel PIX can be sufficiently secured.

As shown in FIG. 4, four pixels PIX1 to PIX4 are arranged in the column direction (the direction D2). Each of the four pixels PIX1 to PIX4 is electrically connected to each of four gate wirings GL1 to GL4. Each of the four pixels PIX1 to PIX4 is electrically connected to each of four source wirings SL1 to SL4. Each of the four pixels PIX1 to PIX4 is electrically connected to a capacitance wiring CW. In the explanation of the display device 10, in the case where the pixels PIX1 to PIX4 are not distinguished, the pixels are described as the pixels PIX, and when the pixels PIX1 to PIX4 are distinguished, the pixels are described as the pixels PIX1 to PIX4. Similar to the pixel PIX, in the case where the gate wirings GL1 to GL4 are not distinguished, the gate wirings are described as the gate wirings GL, and in the case where the gate wirings GL1 to GL4 are distinguished, the gate wirings are described as the gate wirings GL1 to GL4. Similar to the pixel PIX, in the case where the source wirings SL1 to SL4 are not distinguished, the source wirings are referred to as the source wirings SL, and in the case where the source wirings SL1 to SL4 are distinguished, the source wirings are referred to as the source wirings SL1 to SL4.

The pixel PIX includes the transistor Tr, a liquid crystal device LE, and a storage capacitance C. A gate of the transistor Tr is connected to the gate wiring GL, a source of the transistor Tr is connected to the source wiring SL, and a drain of the transistor Tr is connected to one electrode of the liquid crystal device LE and one electrode of the storage capacitance C. The other electrode of the liquid crystal device LE is connected to the common electrode 218 (see FIG. 7). The other electrode of the storage capacitance C is connected to the capacitance wiring CW.

The transistor Tr has a function of switching between an on-state and an off-state so as to control a writing period of the data signal supplied from the source wiring SL to the pixel PIX. The potential corresponding to the data signal supplied from the source wiring SL can be written to the storage capacitance C electrically connected to the transistor Tr by turning on the transistor Tr. Further, the potential held in the storage capacitance C can be held by turning off the transistor Tr.

For example, the on-voltage is simultaneously supplied to the four gate wirings GL, and the transistors Tr of the four pixels PIX1 to PIX4 are simultaneously turned on. In this state, the source wirings SL1 to SL4 are supplied with the data signal. As a consequence, the four pixels PIX1 to PIX4 arranged in the direction D2 can be driven at the same timing.

Planer Layout and Cross-Sectional Structure of Pixels

Figure 5:
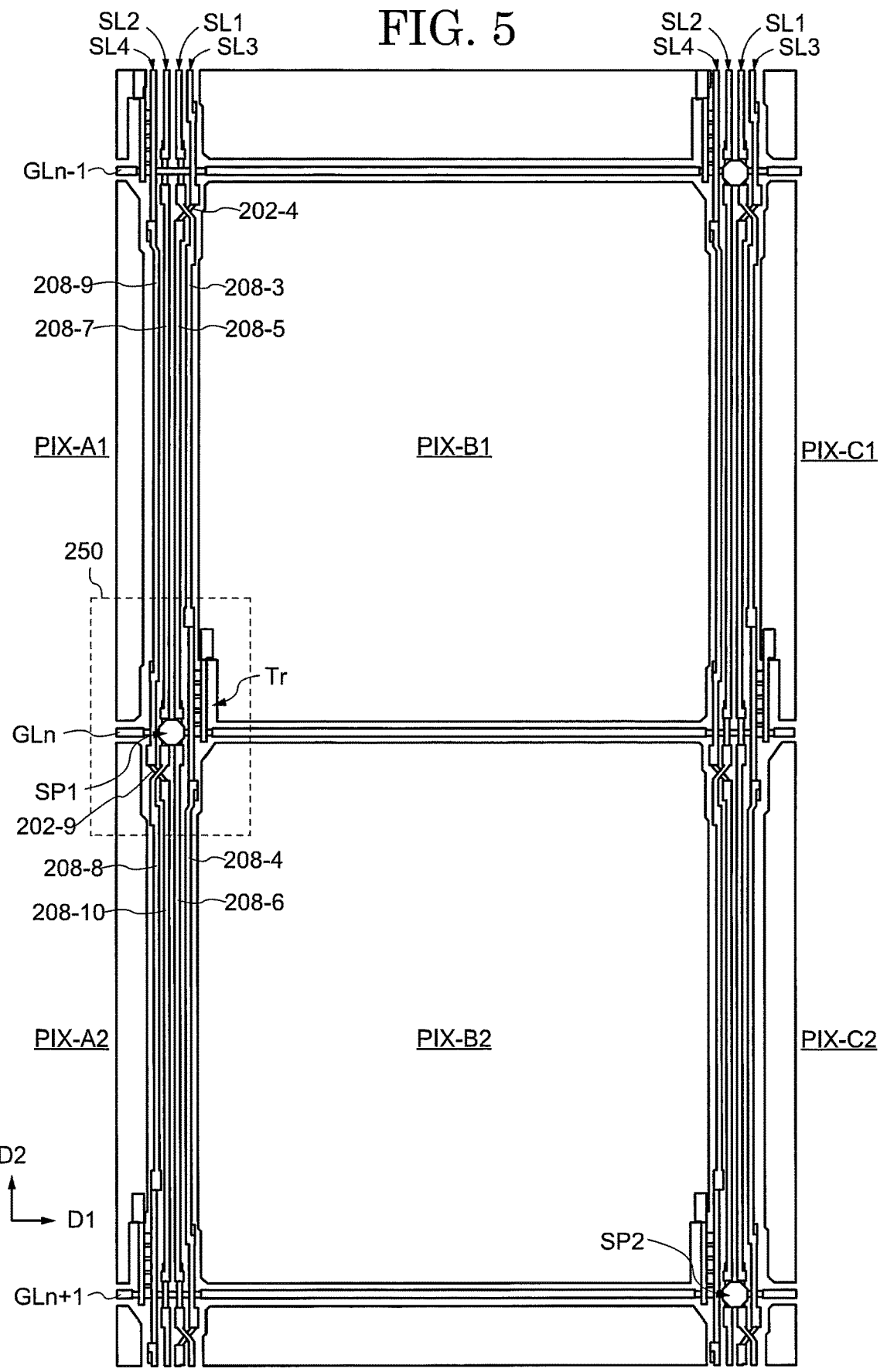
FIG. 5 is a planar layout of pixels according to an embodiment of the present invention.
Figure 6:
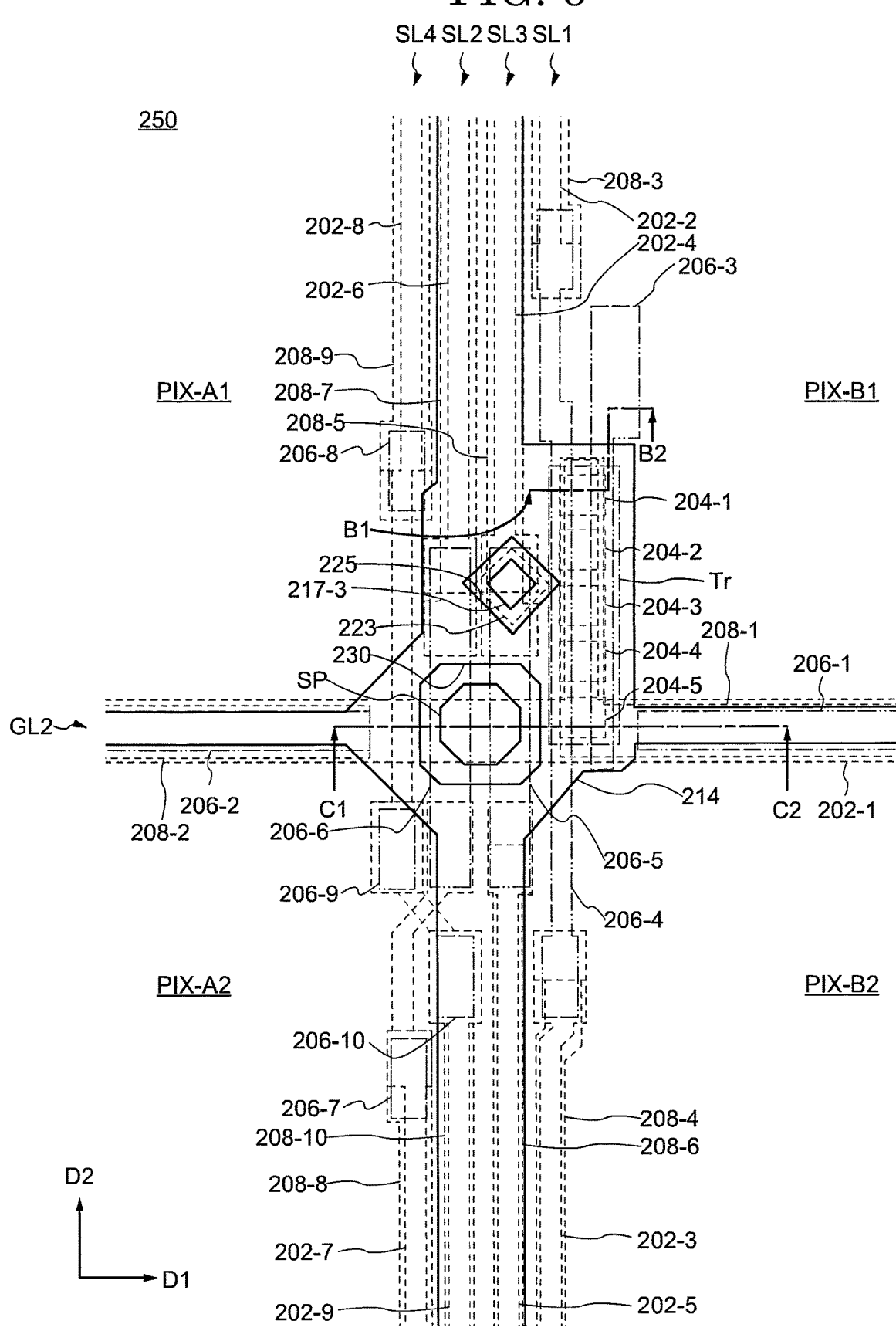
FIG. 6 is an enlarged view of a planar layout of pixels according to an embodiment of the present invention.
Figure 7:
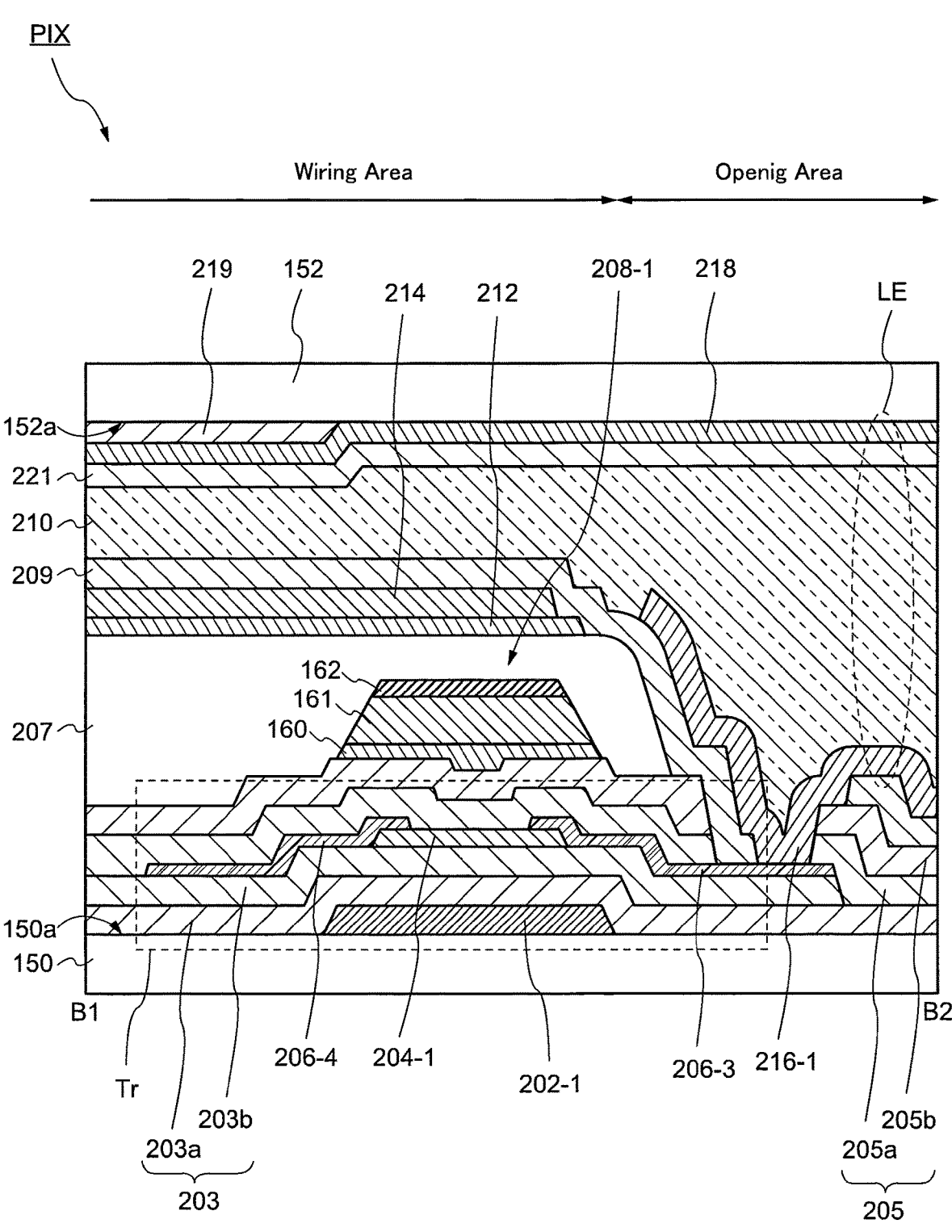
FIG. 7 is a cross-sectional view of the pixel taken along a line B1-B2 shown in FIG. 6.
Figure 8:
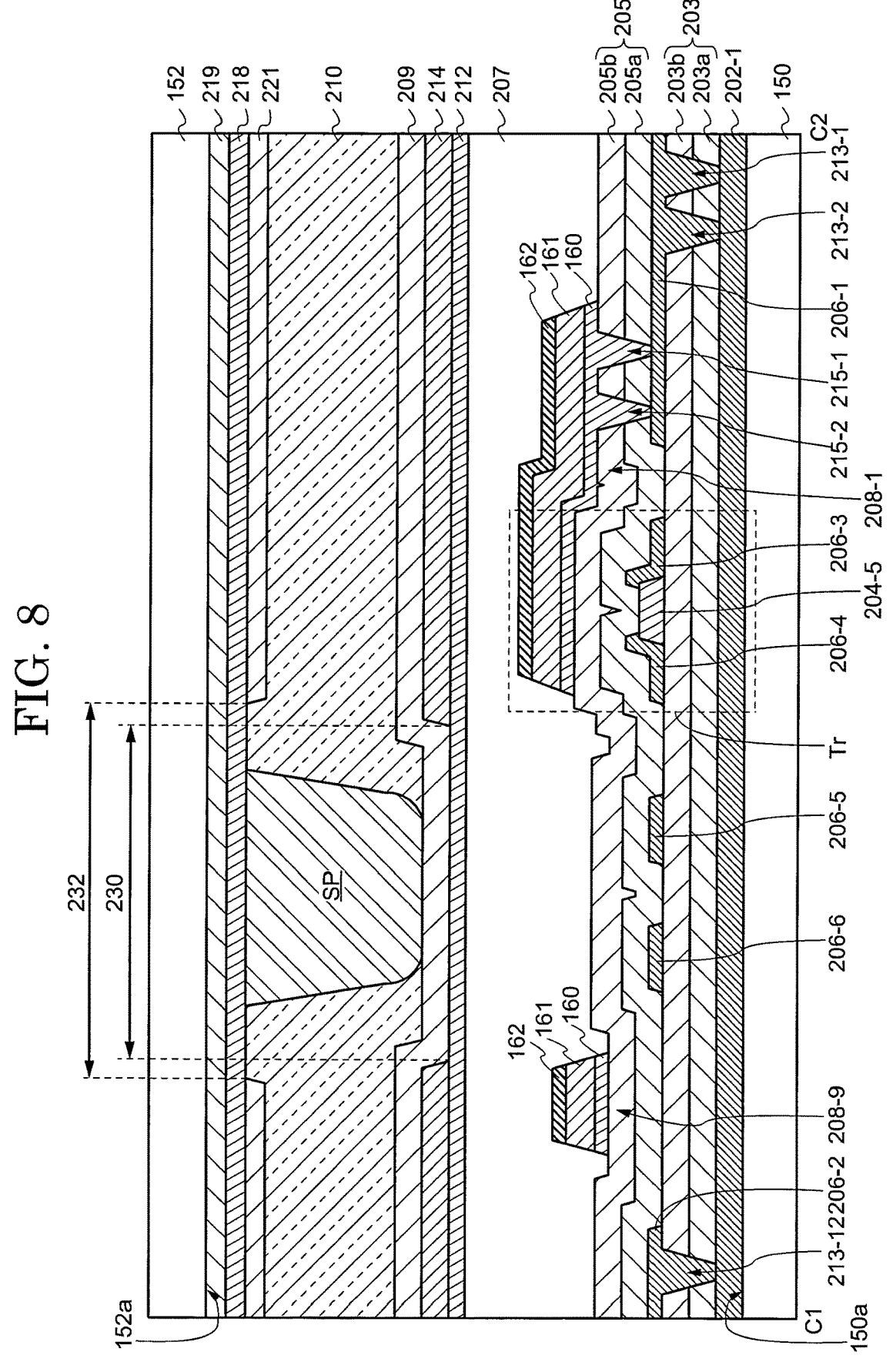
FIG. 8 is a cross-sectional view of the pixel taken along a line C1-C2 shown in FIG. 6.

With reference to FIG. 5 to FIG. 12, outlines of a planar layout and a cross-sectional structure of pixels included in the display device 10 will be described. FIG. 5 is a plan view of pixels showing a configuration in which pixels PIX-A1, PIX-A2, PIX-B1, PIX-B2, PIX-C1, and PIX-C2 are viewed in a plan view. FIG. 6 is an enlarged view of an area 250 of the pixel shown in FIG. 5. FIG. 7 is a cross-sectional view of the pixels taken along a line B1-B2 shown in FIG. 6. FIG. 8 is a cross-sectional view of the pixel taken along a line C1-C2 shown in FIG. 6. FIG. 9 to FIG. 12 are enlarged views of a planar layout of the pixels shown in FIG. 5.

Configurations that are the same as or similar to the configurations in FIG. 1 to FIG. 4 will be described as necessary. In addition, for the sake of clarity, a planarization film 207, a transparent conductive layer 212, a conductive layer 214, the pixel electrode 216, and the like are not shown in an enlarged view of the area 250 of the pixel shown in FIG. 6.

First, referring to FIG. 5, a configuration in which the pixels PIX-A1, PIX-A2, PIX-B1, PIX-B2, PIX-C1, and PIX-C2 are viewed in a plan view will be described. As shown in FIG. 5, gate wirings GLn−1 to GLn+1 are arranged along the direction D1. In addition, the source wirings SL1 to SL4 are arranged along the direction D2. For example, an opening area of the pixel PIX-B1 is an area surrounded by the adjoining gate wiring GLn−1, the gate wiring GLn, the source wiring SL1, and the source wiring SL4.

The source wiring SL1 and the source wiring SL3, and the source wiring SL2 and the source wiring SL4 are provided so as to sandwich the pixels PIX-B1 and PIX-B2 arranged along the direction D2 (one column). In other words, the four source wirings SL1 to SL4 are arranged between the pixels PIX-A1 and PIX-A2 arranged along the direction D2 (one column), and the pixels PIX-B1 and PIX-B2 arranged along the direction D2 (one column).

The transistor Tr is provided in the area 250 where the gate wiring GL and the source wirings SL1 to SL4 intersect each other. The transistor Tr is connected to a pixel electrode (see FIG. 7). The pixel electrode is provided in an opening area of the pixel PIX-B1. Further, a plurality of spacers SP are arranged so as to have regularity at intersections of the pixels PIX arranged in a matrix. For example, a plurality of spacers may be arranged in every other row and every other column of pixel PIX. In other words, the spacers SP may not be arranged at intersections adjacent to the intersections where the spacers SP are arranged.

In the area 250 where the gate wiring GL and the source wirings SL1 to SL4 intersect, the source wiring SL2 and the source wiring SL4 are adjacent to the pixel PIX-A1 and the pixel PIX-A2, and in the area 250, the source wiring SL1 and the source wiring SL3 are adjacent to the pixel PIX-B1 and the pixel SL4. For example, a spacer SP1 overlaps the source wiring SL3 adjacent to the pixel PIX-B1 and the pixel PIX-B2, and the source wiring SL2 adjacent to the pixel PIX-A1 and the pixel PIX-A2. A spacer SP2 overlaps the source wiring SL4 adjacent to the pixel PIX-B2 and the pixel PIX-B3 (not shown), and the source wiring SL3 adjacent to the pixel PIX-C2 and the pixel PIX-C3 (not shown).

Next, referring to FIG. 6 to FIG. 12, a detailed description will be given of the area 250 where the gate wiring GL and the source wirings SL1 to SL4 intersect with each other and the cross-sectional configuration.

FIG. 6 is a planar layout of conductive layers 202-1 to 202-9, oxide semiconductor layers 204-1 to 204-5, conductive layers 206-1 to 206-10, conductive layers 208-1 to 208-10, and the conductive layer 214 in the area 250. A stacking order of the layers in the cross-sectional view of the pixels included in the display device 10 will be described while referring to FIG. 7, which is a cross-sectional view of the pixels taken along the B1-B2 shown in FIG. 6.

As shown in FIG. 7, the conductive layer 202-1 is provided on the first surface 150a of the array substrate 150. A gate insulating film 203 is provided on the conductive layer 202-1. The oxide semiconductor layer 204-1 is provided on the gate insulating film 203. The oxide semiconductor layer 204-1 is provided to face the conductive layer 202-1 with the gate insulating film 203 interposed therebetween. Conductive layers 206-3 and 206-4 are provided on the oxide semiconductor layer 204-1. An insulating film 205 is provided on the conductive layers 206-3 and 206-4. The conductive layer 208-1 is provided on the insulating film 205.

In the case where the conductive layers 202 are not distinguished, the conductive layers 202 are described as the conductive layers 202, and in the case where the conductive layers 202 are distinguished, the conductive layers 202 are described as the conductive layers 202-1 to 202-9. Similar to the conductive layer 202, in the case where the oxide semiconductor layers 204 are not distinguished, the oxide semiconductor layers 204 are described as the oxide semiconductor layers 204, and in the case where the oxide semiconductor layers 204 are distinguished, the oxide semiconductor layers 204 are described as the oxide semiconductor layers 204-1 to 204-5. Similar to the conductive layer 202, in the case where the conductive layers 206 are not distinguished, the conductive layers 206 are described as the conductive layers 206, and in the case where the conductive layers 206 are distinguished, the conductive layers 206 are described as the conductive layers 206-1 to 206-10. Similar to the conductive layer 202, in the case where the conductive layers 208 are not distinguished, the conductive layers 208 are described as the conductive layers 208, and in the case where the conductive layers 208 are distinguished, the conductive layers 208 are described as the conductive layers 208-1 to 208-10.

The conductive layer 202-1 functions as a gate wiring GL (gate electrodes). The conductive layer 206-3 functions as a drain electrode, and the conductive layer 206-4 functions as a source electrode (source wiring SL). The conductive layer 208-1 is a back gate wiring electrically connected to the gate wiring GL (gate electrode), sandwiches the oxide semiconductor layer 204-1 together with the conductive layer 202-1 functioning as the gate wiring GL (gate electrode), and functions as a back gate of the transistor Tr. The conductive layer 202-1, the gate insulating film 203, the oxide semiconductor layer 204-1, and the conductive layers 206-3 and 206-4 function as the transistor Tr.

Further, the conductive layer 208 of the display device 10 includes a first metal conductive layer 160, a second metal conductive layer 161 provided so as to be in contact with the first metal conductive layer 160, and a third metal conductive layer 162 provided so as to be in contact with the second metal conductive layer 161. That is, the conductive layer 208 includes a structure in which three metal conductive layers are stacked. The thickness of the conductive layer 208 is larger than the thickness of the oxide semiconductor layer 204, larger than the thickness of the conductive layer 202, and larger than the thickness of the conductive layer 206.

Although the transistor PIX included in the transistor Tr of the display device 10 is, for example, a transistor driven by a bottom gate, the transistor Tr included in the pixel PIX is not limited to the transistor driven by the bottom gate. The transistor Tr of the display device 10 may be a top-gate driven transistor or a dual-gate driven transistor.

The gate insulating film 203 includes a stacked nitride insulating film 203a and an oxide insulating film 203b. The insulating film 205 includes a stacked oxide insulating film 205a and a stacked nitride insulating film 205b. The oxide semiconductor layer 204-1 is interposed between the oxide insulating film 203b and the oxide insulating film 205a. The oxide insulating film 205a and the oxide insulating film 203b release oxygen during the manufacturing process. The released oxygen is supplied to the oxide semiconductor layer 204-1. This is preferable because oxygen defects generated in the oxide semiconductor layer 204-1 in the manufacturing process can be repaired.

The planarization film 207 is provided on the conductive layer 208-1 and the insulating film 205. The planarization film 207 is provided to alleviate irregularities of the various wirings constituting the transistor Tr. In the case where the display device 10 is applied to a transparent display, the planarization film 207 in the opening area of the pixel PIX is preferably removed. Light absorption by the planarization film 207 in the opening area is suppressed by removing the planarization film 207 in the opening area of the pixel PIX. Therefore, as shown in FIG. 7, the planarization film 207 is arranged in the wiring area, is removed in the opening area, and is not arranged in the opening area. More specifically, the planarization film 207 is provided so as to overlap the gate wirings GLn−1 to GLn+1 and the source wirings SL1 to SL4 shown in FIG. 5, and referring to FIG. 7, the planarization film is provided in an area overlapping the conductive layer 206-4 and the transistor Tr, and is not provided between the conductive layer 206-3 and a pixel electrode 216-1. As a result, transmittance of light in the opening area of the display device 10 is improved as compared with the case where the planarization film 207 is provided in the opening area.

The transparent conductive layer 212 is provided on the planarization film 207. The conductive layer 214 is provided in contact with the transparent conductive layer 212. The transparent conductive layer 212 and the conductive layer 214 function as a capacitance wiring CW. The transparent conductive layer 212 and the conductive layer 214 are provided at positions overlapping the gate wirings GLn−1 to GLn+1 and the source wirings SL1 to SL4 shown in FIG. 5. In addition, the conductive layer 214 also functions as a light shielding layer. Although the configuration in which the conductive layer 214 of the display device 10 is provided on the transparent conductive layer 212 is described, a configuration in which the transparent conductive layer 212 is provided on the conductive layer 214 may be used. An insulating film 209 is provided on the conductive layer 214. Since the planarization film 207 in the opening area is removed, the insulating film 209 in the opening area is in contact with the insulating film 205. The pixel electrode 216-1 is provided on the insulating film 209. The pixel electrode 216-1 is connected to the conductive layer 206-3 via contact holes provided in the insulating films 205 and 209. The pixel electrode 216-1 is provided in an opening area of the pixel PIX. The pixel electrode 216-1 covers a portion of the conductive layer 206-3 without covering the source wiring SL and the transistor Tr.

As shown in FIG. 7, an end portion of the transparent conductive layer 212 provided on the planarization film 207 overlapping the transistor Tr is provided between an end portion of the conductive layer 214 and the pixel electrode 216-1, and the conductive layer 214 provided on the planarization film 207 overlapping the transistor Tr is provided so as to overlap the transistor Tr. Consequently, the transistor Tr can be shielded from light. Therefore, the display device 10 can suppress a leakage current (light leakage) generated in the oxide semiconductor layers 204-1 to 204-5 included in the transistor Tr as the light is irradiated, and can suppress the deterioration of the electric properties of the transistor Tr.

The opposing substrate 152 is provided so as to face the array substrate 150. The opposing substrate 152 is provided with a light shielding layer 219, the common electrode 218, and an insulating film 221. The light shielding layer 219 functions as a black matrix. In the structure shown in FIG. 7, the light shielding layer 219 is provided in an area overlapping the conductive layer 206-4. The light shielding layer 219 is arranged in a grid pattern so as to cover the gate wirings GLn−1 to GLn+1 and the source wirings SL1 to SL4. The common electrode 218 has a size extending over the entire surface of a display area 112. The light shielding layer 219 may be formed of a metal film, and has a function as an auxiliary electrode by being provided in contact with the common electrode 218 formed of a transparent conductive film. The liquid crystal layer 210 is provided between the array substrate 150 and the opposing substrate 152, and is sealed with the sealing material 154 (see FIG. 1). The pixel electrode 216-1, the liquid crystal layer 210, and the common electrode 218 constitute a liquid crystal device LE. Further, although not shown, the array substrate 150 is provided with an alignment film so as to cover the insulating film 209 and the pixel electrode 216-1, and the opposing substrate 152 is provided with an alignment film so as to cover the insulating film 221.

Figure 9:
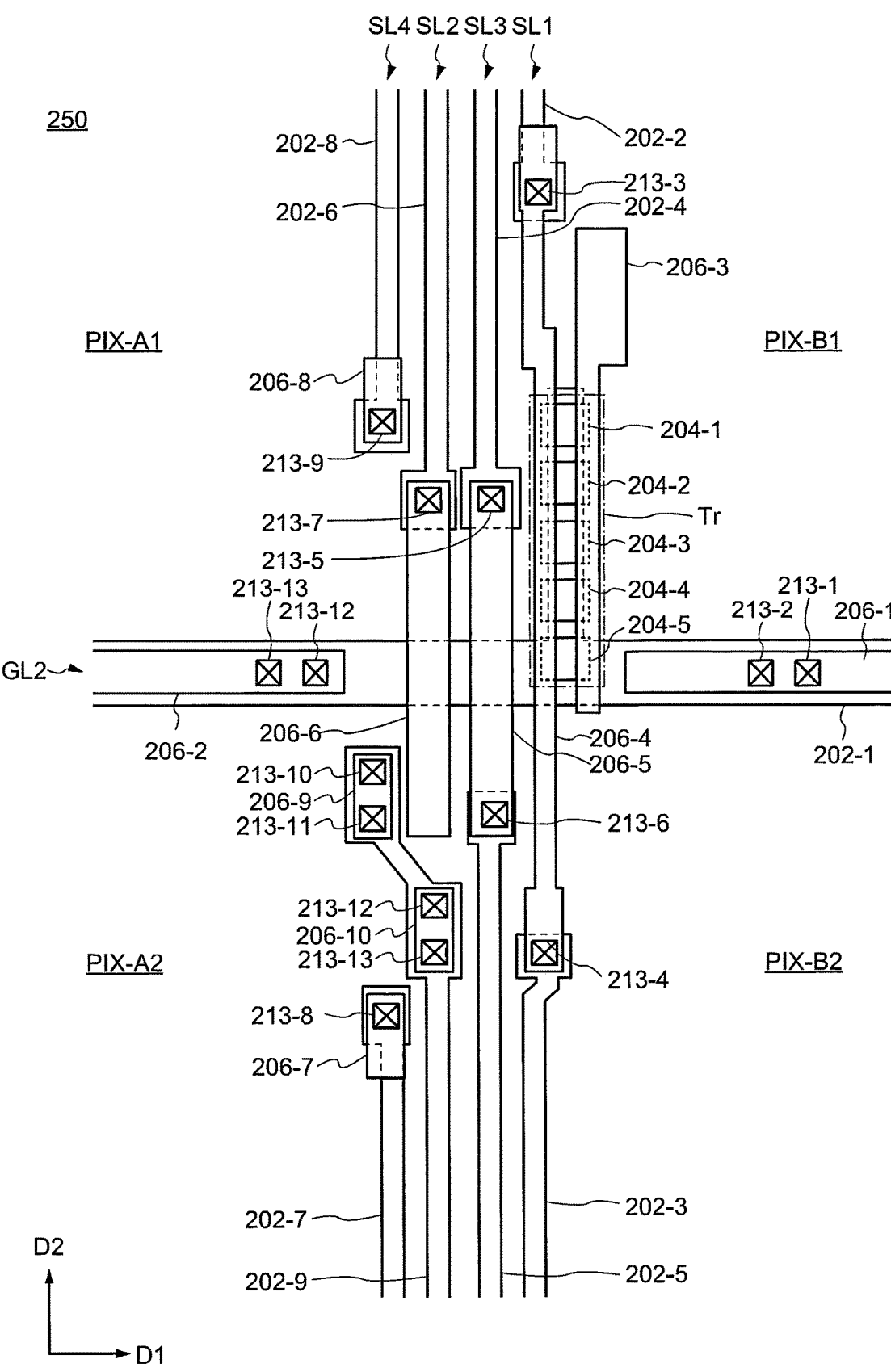
FIG. 9 is an enlarged view of a planar layout of pixels according to an embodiment of the present invention.

FIG. 9 is a planar layout of the conductive layers 202-1 to 202-9, the oxide semiconductor layers 204-1 to 204-5, and the conductive layers 206-1 to 206-10 in the area 250. The conductive layers 202-1 to 202-9 are provided on the array substrate 150. The conductive layer 202-1 has an area extending in the direction D1 and branching in the direction D2. The conductive layers 202-2 to 202-9 extend in the direction D2. Further, the oxide semiconductor layer 204-1 to the oxide semiconductor layer 204-5 are provided on the conductive layer 202-1. The gate insulating film 203 (see FIG. 7) is provided between the oxide semiconductor layers 204-1 to 204-5 and the conductive layer 202-1. The oxide semiconductor layers 204-1 to 204-5 are arranged so as to have independent square-shaped patterns and are to be arranged side by side in the direction D2. The transistor Tr of the pixel PIX includes, for example, five oxide semiconductor layers 204-1 to 204-5. The number of the oxide semiconductor layers is not limited to five. For example, the number of the oxide semiconductor layers may be plural. For example, the oxide semiconductor layer is separately provided in a plurality of oxide semiconductor layers (for example, the oxide semiconductor layers 204-1 to 204-5), whereby variations in the properties of the transistor Tr caused by heat generation of the oxide semiconductor layer are suppressed. Further, light guided through a glass substrate (the array substrate 150) from the conductive layer 202-1 side toward the oxide semiconductor layers 204-1 to 204-5 is reflected by the conductive layer 202-1 by providing the oxide semiconductor layers 204-1 to 204-5 on the conductive layer 202-1. As a consequence, the transistor Tr can suppress the leakage current (light leakage) generated in the oxide semiconductor layers 204-1 to 204-5 by irradiating light.

The conductive layers 206-1 to 206-10 are provided on the gate insulating film 203 and the oxide semiconductor layers 204-1 to 204-5. The conductive layers 206-1 and 206-2 extend in the direction D1, and the conductive layers 206-3 to 206-10 extend in the direction D2.

The conductive layer 202-1 overlaps the conductive layer 206-1 and is connected to the conductive layer 206-1 via contact holes 213-1 and 213-2 provided in the gate insulating film 203. Further, the conductive layer 202-1 overlaps the conductive layer 206-2 and is connected to the conductive layer 206-2 via contact holes 213-12 and 213-13 provided in the gate insulating film 203. An area extending in the direction D1 of the conductive layer 202-1 functions as a gate wiring. In addition, an area extending in the direction D2 of the conductive layers 202-1 functions as a gate electrode.

The conductive layers 202-2 and 202-3 overlap the conductive layer 206-4. The conductive layer 202-2 is connected to the conductive layer 206-4 via a contact hole 213-3 provided in the gate insulating film 203. The conductive layer 202-3 is connected to the conductive layer 206-4 via a contact hole 213-4 provided in the gate insulating film 203. That is, the conductive layer 202-2 is connected to the conductive layer 202-3 via the conductive layer 206-4. The conductive layer 206-4 intersects the conductive layer 202-1. In the conductive layer 206-4, areas not overlapping the conductive layers 202-2 and 202-3 function as source electrodes of the transistor Tr. The conductive layer 206-3 functions as a drain electrode of the transistors Tr.

The conductive layer 202-4 overlaps the conductive layer 206-5 and is connected to the conductive layer 206-5 via a contact hole 213-5 provided in the gate insulating film 203. The conductive layer 202-5 overlaps the conductive layer 206-5 and is connected to the conductive layer 206-5 via a contact hole 213-6 provided in the gate insulating film 203. That is, the conductive layer 202-4 is connected to the conductive layer 202-5 via the conductive layer 206-5.

The conductive layer 202-6 overlaps the conductive layer 206-6 and is connected to the conductive layer 206-6 via a contact hole 213-7 provided in the gate insulating film 203. The conductive layer 206-6 overlaps the conductive layer 208-8 (see FIG. 10) and is connected to the conductive layer 208-8 via contact holes 215-11 and 215-12 (see FIG. 10) provided in the insulating film 205. The conductive layer 208-8 overlaps the conductive layer 206-7 and the conductive layer 202-7, and is connected to the conductive layer 206-7 via contact holes 215-13 and 215-14 (see FIG. 10) provided in the insulating film 205. The conductive layer 202-7 overlaps the conductive layer 206-7 and is connected to the conductive layer 206-7 via a contact hole 213-8 provided in the gate insulating film 203. That is, the conductive layer 202-6 is connected to the conductive layer 202-7 via the conductive layer 206-6, the conductive layer 208-8, and the conductive layer 206-7.

The conductive layer 202-8 overlaps the conductive layer 206-8 and is connected to the conductive layer 206-8 via a contact hole 213-9 provided in the gate insulating film 203. The conductive layer 206-8 overlaps the conductive layer 208-9 (see FIG. 10) and is connected to the conductive layer 206-8 via a contact hole 215-18 (see FIG. 10) provided in the insulating film 205. The conductive layer 208-9 overlaps the conductive layer 206-9 and is connected to the conductive layer 206-9 via contact holes 215-15 and 215-16 (see FIG. 10) provided in the insulating film 205. The conductive layer 206-9 overlaps the conductive layer 202-9 and is connected to the conductive layer 202-9 via contact holes 213-10 and 213-11 provided in the gate insulating film 203. The conductive layer 202-9 overlaps the conductive layer 206-10 and is connected to the conductive layer 206-10 via the contact holes 213-12 and 213-13 provided in the gate insulating film 203. That is, the conductive layer 202-8 is connected to the conductive layer 202-9 via the conductive layers 206-8 and 206-9 and the conductive layer 208-9.

The conductive layer 202-9 and the conductive layer 208-8 have bent areas. The conductive layer 202-9 has an area that overlaps and intersects the conductive layer 208-8 (See FIG. 10). That is, the second source wiring SL2 has an area in which the second source wiring SL2 and the fourth source wiring SL4 intersect each other. Although not described in detail, as shown in FIG. 5, the conductive layer 202-4 and the conductive layer 208-3 have bent areas. The conductive layer 202-4 has an area that overlaps and intersects the conductive layer 208-3. That is, the first source wiring SL1 has an area in which the first source wiring SL1 and the third source wiring SL3 intersect each other.

In addition, as shown in FIG. 9, the conductive layer 202-1 extends along the direction D1. The gate wiring GL in the areas intersecting (overlapping) with the source wiring SL1 to the source wiring SL4 includes only the conductive layer 202-1, and the conductive layer 206-1 and the conductive layer 206-2 are spaced apart from each other.

Figure 10:
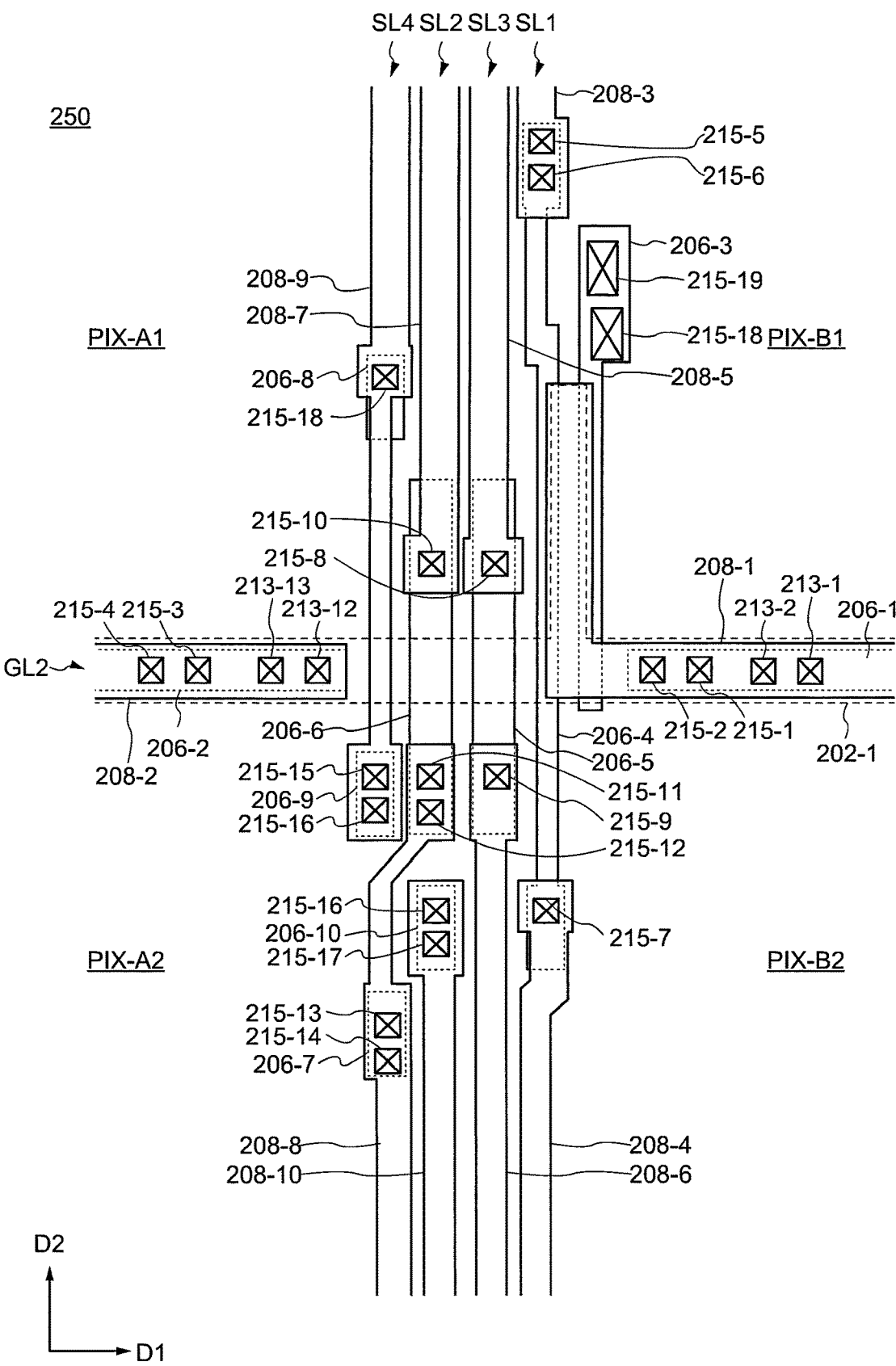
FIG. 10 is an enlarged view of a planar layout of pixels according to an embodiment of the present invention.

FIG. 10 is a planar layout of conductive layer 202-1, conductive layers 206-1 to 206-10, and conductive layers 208-1 to 208-10 in the area 250. The conductive layers 206-1 to 206-10 are as described with reference to FIG. 5, FIG. 7, and FIG. 9. The conductive layers 208-1 to 208-10 are provided on the insulating film 205 (see FIG. 7). The conductive layer 208-1 has an area extending in the direction D2 and an area extending in the direction D1. The conductive layer 208-2 extends in the direction D1, and the conductive layers 208-3 to 208-10 extend in the direction D2.

The area extending in the direction D2 of the conductive layer 208-1 overlaps the oxide semiconductor layers 204-1 to 204-5. The area extending in the direction D1 of the conductive layer 208-1 overlaps the conductive layer 206-1 and is connected to the conductive layer 206-1 via contact holes 215-1 and 215-2 provided in the insulating film 205. Further, the conductive layer 208-1 overlaps the conductive layer 202-1 (see FIG. 9), and is connected to the conductive layer 202-1 via the contact holes 215-1 (see FIG. 10) and 215-2 (see FIG. 10) provided in the insulating film 205, the conductive layer 206-1, and the contact holes 213-1 and 213-2 provided in the gate insulating film 203 (see FIG. 9).

The conductive layer 208-2 overlaps the conductive layer 206-2, and is connected to the conductive layer 206-2 via contact holes 215-3 and 215-4 provided in the insulating film 205. Further, the conductive layer 208-2 overlaps the conductive layer 202-1, and is connected to the conductive layer 202-1 via the contact holes 215-3 and 215-4 provided in the insulating film 205, the conductive layer 206-2, and the contact holes 213-12 (see FIG. 9) and 213-13 (see FIG. 9) provided in the gate insulating film 203.

The conductive layer 208-3 overlaps the conductive layer 206-4, and is connected to the conductive layer 206-4 via contact holes 215-5 and 215-6 provided in the insulating film 205. The conductive layer 208-4 overlaps the conductive layer 206-4, and is connected to the conductive layer 206-4 via a contact hole 215-7 provided in the insulating film 205. That is, the conductive layer 208-3 is connected to the conductive layer 208-4 via the conductive layer 206-4.

The conductive layer 208-3 overlaps the conductive layer 202-2 (see FIG. 9), and is connected to the conductive layer 202-2 via the contact holes 215-5 and 215-6 provided in the insulating film 205, the conductive layer 206-4, and the contact hole 213-3 (see FIG. 9) provided in the gate insulating film 203. Further, the conductive layer 208-4 overlaps the conductive layer 202-3 (see FIG. 9), and is connected to the conductive layer 202-3 via the contact hole 215-7 provided in the insulating film 205, the conductive layer 206-4, and the contact hole 213-4 (see FIG. 9) provided in the gate insulating film 203.

The conductive layer 208-5 overlaps the conductive layer 206-5, and is connected to the conductive layer 206-5 via a contact hole 215-8 provided in the insulating film 205. The conductive layer 208-6 overlaps the conductive layer 206-5, and is connected to the conductive layer 206-5 via a contact hole 215-9 provided in the insulating film 205. That is, the conductive layer 208-5 is connected to the conductive layer 208-6 via the conductive layer 206-5.

The conductive layer 208-5 overlaps the conductive layer 202-4 (see FIG. 9), and is connected to the conductive layer 202-4 via the contact hole 215-8 provided in the insulating film 205, the conductive layer 206-5, and the contact hole 213-5 (see FIG. 9) provided in the gate insulating film 203. Further, the conductive layer 208-6 overlaps the conductive layer 202-5 (see FIG. 9), and is connected to the conductive layer 202-5 via the contact hole 215-9 provided in the insulating film 205, the conductive layer 206-5, and the contact hole 213-6 (see FIG. 9) provided in the gate insulating film 203.

The conductive layer 208-7 overlaps the conductive layer 206-6, and is connected to the conductive layer 206-6 via a contact hole 215-10 provided in the insulating film 205. The conductive layer 208-8 overlaps the conductive layer 206-6, and is connected to the conductive layer 206-6 via contact holes 215-11 and 215-12 provided in the insulating film 205. That is, the conductive layer 208-7 is connected to the conductive layer 208-8 via the conductive layer 206-6.

In addition, the conductive layer 208-7 overlaps the conductive layer 202-6 (see FIG. 9), and is connected to the conductive layer 202-6 via the contact hole 215-10 provided in the insulating film 205, the conductive layer 206-6, and the contact hole 213-7 (see FIG. 9) provided in the gate insulating film 203. Further, the conductive layer 208-8 overlaps the conductive layer 202-7 (see FIG. 9), and is connected to the conductive layer 202-7 via the contact holes 215-11 and 215-12 provided in the insulating film 205, the conductive layer 206-6, the contact holes 215-13 and 215-14 provided in the insulating film 205, the contact hole 213-8 provided in the gate insulating film 203 (see FIG. 9), and the conductive layer 206-7 (see FIG. 9).

The conductive layer 208-9 overlaps the conductive layer 206-9, and is connected to the conductive layer 206-9 via the contact holes 215-15 and 215-16 provided in the insulating film 205. The conductive layer 208-10 overlaps the conductive layer 206-10, and is connected to the conductive layer 206-10 via contact holes 215-16 and 215-17 provided in the insulating film 205.

In addition, the conductive layer 208-9 overlaps the conductive layer 202-8 (see FIG. 9), and is connected to the conductive layer 202-8 via the contact hole 215-18 provided in the insulating film 205, the conductive layer 206-8, and the contact hole 213-9 (see FIG. 9) provided in the gate insulating film 203. Further, the conductive layer 208-9 overlaps the conductive layer 202-9 (see FIG. 9), and is connected to the conductive layer 202-9 via the contact holes 215-15 and 215-16 provided in the insulating film 205, the conductive layer 206-9 (see FIG. 9), and the contact holes 213-10 and 213-11 (see FIG. 9) provided in the gate insulating film 203. Further, the conductive layer 208-10 overlaps the conductive layer 202-9, and is connected to the conductive layer 202-9 via the contact holes 215-16 and 215-17 provided in the insulating film 205, the conductive layer 206-10 (see FIG. 9), and contact holes 213-12 and 213-13 (see FIG. 9) provided in the gate insulating film 203. That is, the conductive layer 208-9 is connected to the conductive layer 208-10 via the conductive layers 206-9 and 206-10 and the conductive layer 202-9.

Figure 11:
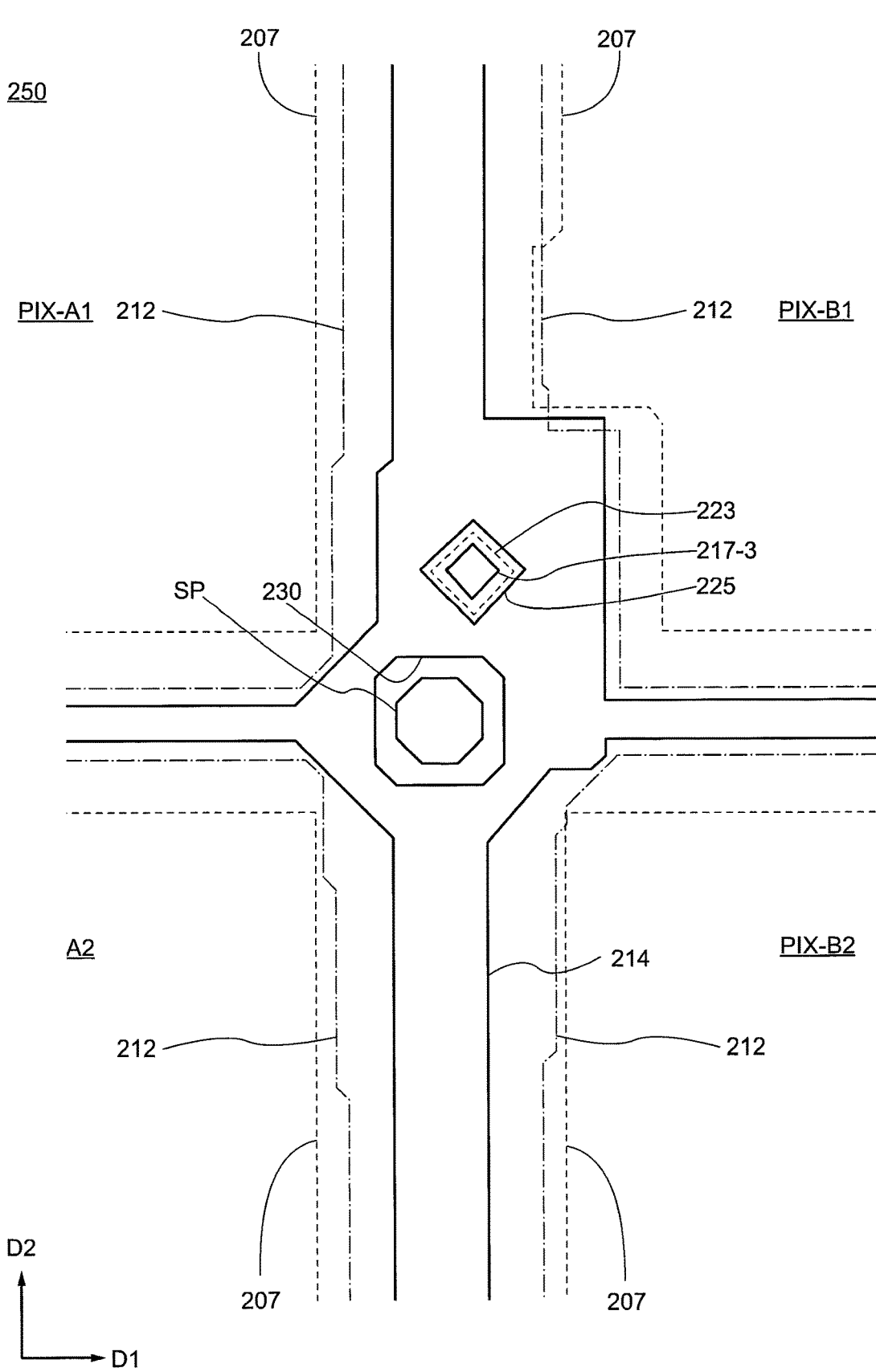
FIG. 11 is an enlarged view of a planar layout of pixels in a display device according to an embodiment of the present invention.

FIG. 11 is a plan view of the planarization layer 207, the transparent conductive layer 212, the conductive layer 214, and the spacer SP in the area 250. Referring to the planar layout of the pixels shown in FIG. 11 and the cross-sectional view of the pixels shown in FIG. 7, the planarization layer 207 has been removed in the open area of the pixels PIX1 to PIX4. That is, the planarization film 207 is provided on the wiring area. Specifically, the planarization film 207 is provided in a grid pattern so as to cover the gate wiring GL and the source wirings SL1 to SL4. Further, the transparent conductive layer 212 is provided on the planarization film

207, and the conductive layer 214 is provided so as to be in contact with the transparent conductive layer 212. The transparent conductive layer 212 and the conductive layer 214 function as the capacitive wiring CW (see FIG. 4). The conductive layer 214 and the transparent conductive layer 212 are provided in a grid pattern on the conductive layers 202-1 to 202-9, the conductive layers 206-1 to 206-10, and the conductive layers 208-1 to 208-10 via the planarization film 207. Specifically, the conductive layer 214 and the transparent conductive layer 212 are provided in a grid pattern so as to cover the gate wiring GL and the source wirings SL1 to SL4, similar to the planarization film 207. The transparent conductive layer 212 has an opening 223, and the conductive layer 214 has an opening 225. The opening 223 and the opening 225 are provided so as to overlap each other. In addition, the transparent conductive layer 212 may not be provided in a grid pattern but may be provided on the entire surface.

The source wirings SL1 to SL4 are less susceptible to the potential supplied to the capacitance wiring CW because the source wirings are spaced apart from the capacitance wiring CW in the direction D3. Further, the electric resistance of the conductive layer 214 is smaller than the electric resistance of the transparent conductive layer 212 and is provided in a grid pattern. The potential supplied from the capacitance wiring CW to the pixel PIX in absence of the conductive layer 214 is not uniform depending on the position of the pixel PIX, and therefore, a sufficient potential is not supplied to the pixel PIX to stabilize the display. On the other hand, since the capacitance wiring CW of the display device 10 includes the conductive layer 214, the potential supplied from the capacitance wiring CW to the pixel PIX is uniform without depending on a position of the pixel PIX in the display area 12. Consequently, the capacitance wiring CW of the display device 10 can supply a sufficient potential to the pixel PIX in order to stabilize the display.

In addition, the transparent conductive layer 212 and the conductive layer 214 are provided so as to cover not only the gate wiring GL and the source wirings SL1 to SL4 but also the transistor Tr. As will be described in detail later, the conductive layer 214 is formed using a metal material, and therefore has a light shielding property. Therefore, the conductive layers 214 can shield the wiring area including the gate wiring GL and the source wirings SL1 to SL4 from light. Further, light guided through the glass substrate (the opposing substrate 152) from the transparent conductive layer 212 and the conductive layer 214 side toward the oxide semiconductor layers 204-1 to 204-5 is reflected by the conductive layer 214. As a result, the display device 10 can suppress a leakage current (light leakage) generated in the oxide semiconductor layers 204-1 to 204-5 due to the irradiation of light.

A width of the conductive layer 214 is larger than a combined width of respective widths of the source wirings SL1 to SL4 in a plan view. In addition, the width of the conductive layer 214 is larger than a width of the gate wiring GL in a plan view. That is, since the conductive layer 214 covers the wiring area including the gate wiring GL and the source wirings SL1 to SL4, it is possible to prevent the light (reflected light) reflected by end portions of the source wirings SL1 to SL4 from being radiated to the inside of the display panel 102. In addition, the width of the conductive layer 214 is a length of the conductive layer 214 in the direction (the direction D1) intersecting the direction in which the source wiring SL1 to SL4 extend (the direction D2), and the combined width of each of the source wirings SL1 to SL4 is a combined length of widths of the source wirings SL1 to SL4 in the direction (the direction D1) intersecting the direction in which the source wirings SL1 to SL4 extend (the direction D2). The width of the gate wiring GL is a length of the gate wiring GL in the direction (the direction D2) intersecting the direction in which the gate wiring GL extends (the direction D1).

For example, as described with respect to FIG. 6 to FIG. 10, the plurality of pixels PIX includes the pixel PIX-B2 arranged side by side with the pixel PIX-B1 along the direction D2. As shown in FIG. 5, the pixel PIX-B2 includes the gate wiring GL3 (GLn+1) extending in the direction D1 and the source wiring SL2 extending in the direction D2 in a plan view. The conductive layer 202 includes the gate wiring GL3, and may function as a gate wiring and a gate electrode, and the conductive layer 206-6 and the conductive layer 208-7 include the source wiring SL2, and may function as a source electrode and a source wiring. The gate wiring GL3 is provided so as to be spaced apart from the gate wiring GL2 extending in the direction D1 in the direction D2 in a plan view. The source wiring SL2 is provided so as to be parallel to the source electrode of the transistor Tr included in the conductive layer 206-4 along the direction D2 in a plan view, and overlaps (intersects) the gate wiring GL2. The source wiring SL2 overlaps (intersects) the gate wiring GL3 in a plan view.

For example, in the planar layout shown in FIG. 6 and FIG. 9 and the cross-sectional structure shown in FIG. 8, in the area where the source wiring SL2 overlaps the gate wiring GL2, the source wiring SL2 included in the conductive layer 206-6 and the source electrode of the transistor Tr included in the conductive layer 206-4 overlap the gate wiring GL2 included in the conductive layer 202-1.

Referring to the planar layout of the pixels shown in FIG. 6, FIG. 9, and FIG. 11 and the cross-sectional structures shown in FIG. 7 and FIG. 8, the spacer SP is arranged so as to be located at an intersection of the gate wiring GL2 and the source wirings SL2 and SL3. At the intersection between the gate wiring GL2 and the source wirings SL2 and SL3, the gate wiring GL2 is constituted by the conductive layer 202-1, and the source wirings SL2 and SL3 are constituted by the conductive layers 206-5 and 206-6. Further, the spacer SP is not arranged at an intersection of the gate wiring GL2 and the source wirings SL1 and SL4. At the intersection between the gate wiring GL2 and the source wirings SL1 and SL4, the gate wiring GL2 is constituted by the conductive layer 202-1, and the source wirings SL1 and SL4 are constituted by the conductive layers 208-1 and 208-9. Film thicknesses of the conductive layers 206-5 and 206-6 are smaller than a film thickness of the conductive layer 202-1 and smaller than film thicknesses of the conductive layers 208-1 and 208-9. Consequently, the display device 10 can intersect the gate wiring GL and the source wiring SL without intersecting a thick conductive layer.

In addition, the transparent conductive layer 212 and the conductive layer 214 are provided on the planarization film 207. An opening 230 is provided in the conductive layer 214. The insulating layer 209 is provided on the transparent conductive layer 212 and the conductive layer 214. The spacer SP is provided inside the opening 230 of the conductive layer 214 and on the insulating film 209.

Further, the spacer SP is arranged so as to be located in an area where the conductive layer 202-1 and the conductive layer 206-5 intersect with each other and in an area where the conductive layer 202-1 and the conductive layer 206-6 intersect with each other. Only thin conductive layers 206-5 and 206-6, the gate insulating film 203 (the nitride insulating film 203*a* and the oxide insulating film 203*b*), the insulating film 205 (the oxide insulating film 205*a* and the nitride insulating film 205*b*), and the planarization film 207 are provided between the spacer SP and the conductive layer 202-1. That is, a thick conductive layer is not provided between the spacer SP and the conductive layer 202-1. By disposing the spacer SP so as to be located on the thin conductive layers 206-5 and 206-6 instead of the thick conductive layer 208, planarization is promoted, and a distance (cell gap) from an upper surface of the array substrate 150 of the display device 10 to an upper surface of the insulating film 209 can be suppressed to a predetermined distance or less.

A plurality of spacers SP is provided on the opposing substrate 152 (see FIG. 5). Further, as shown in FIG. 8, the light shielding layer 219 is provided on the opposing substrate 152. The common electrode 218 is provided so as to be in contact with the light shielding layer 219. Further, the insulating film 221 is provided so as to be in contact with the common electrode 218. An opening 232 is provided in the insulating film 221. In addition, an area in which the opening 232 is provided in the insulating film 221 overlaps an area in which the opening 230 is provided in the conductive layer 214. The spacer SP is provided inside the opening 232 of the insulating film 221. The spacer SP is provided in contact with the common electrode 218.

Figure 12:
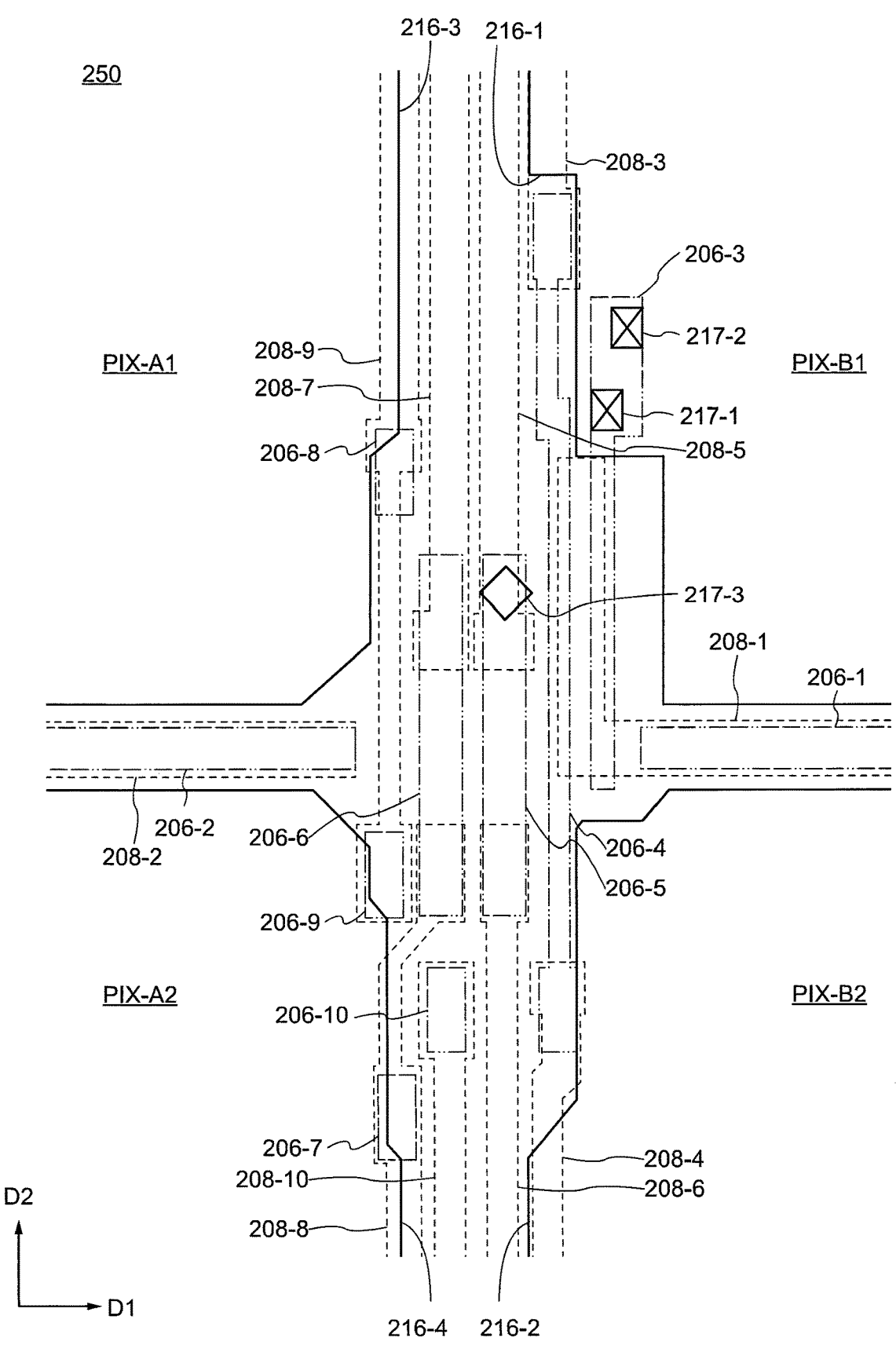
FIG. 12 is an enlarged view of a planar layout of pixels in a display device according to an embodiment of the present invention.

FIG. 12 is a planar layout of the conductive layers 206-1 to 206-10, the conductive layers 208-1 to 208-10, and pixel electrodes 216-1 to 216-4 in the area 250. The conductive layers 206-1 to 206-10 and the conductive layers 208-1 to 208-10 are as described with reference to FIG. 5 and FIG. 7 to FIG. 10. Referring to the planar layout of the pixel shown in FIG. 12 and the cross-sectional view of the pixel shown in FIG. 7, the pixel electrode 216-1 is provided on the insulating film 209 and is provided in the opening area of the pixel PIX. Since pixel electrodes 216-2 to 216-4 are configured in the same manner as the pixel electrode 216-1, the pixel electrode 216-1 will be described here, and the pixel electrodes 216-2 to 216-4 will be described as necessary. The pixel electrode 216-1 is connected to the conductive layer 206-3 via contact holes 217-1 and 217-2 provided in the insulating film 209 and contact holes 215-18 and 215-19 (see FIG. 10) provided in the insulating film 205. A contact hole 217-3 provided in the insulating film 209 is provided so as to overlap the opening 223 and the opening 225 (see FIG. 11) in a plan view. The openings 223 and 225 and the contact hole 217-3 are provided on the planarization film 207. As a result, the display device 10 can release moisture contained in the planarization film 207 through the openings 223 and 225 and the contact hole 217-3.

As described with reference to FIG. 5 to FIG. 12, the gate wiring GL (for example, GL2) is formed by stacking the conductive layer 202-1, the conductive layer 206-1, and the conductive layer 208-1 extending in the direction D1, and the conductive layer 202-1, the conductive layer 206-2, and the conductive layer 208-2 extending in the direction D1.

Further, as described with reference to FIG. 5 to FIG. 12, the source wiring SL1 is formed by laminating the conductive layer 202-2 and the conductive layer 206-4 extending in the direction D2, the conductive layer 206-4 and the conductive layer 208-3 extending in the direction D2, the conductive layer 202-3 and the conductive layer 206-4 extending in the direction D2, and the conductive layer 206-4 and the conductive layer 208-4 extending in the direction D2. In addition, the source wiring SL1 includes only the conductive layer 206-4 in an area intersecting the gate wiring GL, and the conductive layer 202-2 and the conductive layer 202-3 are spaced apart from each other, and the conductive layer 208-3 and the conductive layer 208-4 are spaced apart from each other. The source wiring SL2 is formed by laminating the conductive layer 202-6 and the conductive layer 206-6 extending in the direction D2, the conductive layer 202-6 and the conductive layer 208-7 extending in the direction D2, the conductive layer 206-6 and the conductive layer 208-8 extending in the direction D2, the conductive layer 208-8 and the conductive layer 206-7 extending in the direction D2, and the conductive layer 206-7 and the conductive layer 202-7 extending in the direction D2. In addition, the source wiring SL2 includes only the conductive layer 206-6 in an area intersecting the gate wiring GL, and the conductive layer 202-6 and the conductive layer 202-7 are spaced apart from each other, and the conductive layer 208-7 and the conductive layer 208-8 are spaced apart from each other. The source wiring SL3 is formed by laminating the conductive layer 202-4 and the conductive layer 206-5 extending in the direction D2, the conductive layer 206-5 and the conductive layer 202-5 extending in the direction D2, and the conductive layer 208-5 and the conductive layer 208-6 extending in the direction D2. In addition, the source wiring SL3 includes only the conductive layer 206-5 in an area intersecting the gate wiring GL, and the conductive layer 202-4 and the conductive layer 202-5 are spaced apart from each other, and the conductive layer 208-5 and the conductive layer 208-6 are spaced apart from each other. The source wiring SL4 is formed by laminating the conductive layer 202-8 and the conductive layer 206-8 extending in the direction D2, the conductive layer 206-8 and the conductive layer 208-9 extending in the direction D2, the conductive layer 208-9 and the conductive layer 206-9 extending in the direction D2, and the conductive layer 206-9 and a conductive layer 202-9 extending in the direction D2. In addition, the source wiring SL4 includes only the conductive layer 208-9 in an area intersecting the gate wiring GL, and the conductive layer 202-8 and the conductive layer 202-9 are spaced apart from each other. That is, the conductive layer 202-1 in an area intersecting the gate wiring GL intersects with two different conductive layers, the conductive layer 208 and the conductive layer 206.

Since the source wiring SL of the display device 10 can be formed by stacking a plurality of conductive layers, the source wiring SL1 and the source wiring SL3 can be arranged so as to intersect each other, and the source wiring SL2 and the source wiring SL4 can be arranged so as to intersect each other. Further, since the source wiring of the display device 10 can be formed by stacking a plurality of conductive layers, even if static electricity is generated during the manufacturing process of the display area 12 and the peripheral area 14 in the array substrate 150, the static electricity can be released. Therefore, the manufacturing process of the display device 10 can suppress the occurrence of defects caused by the static electricity.

Further, as described in "Outline of Display Device 10", since the film thickness of the conductive layer 206 is thinner than the film thicknesses of the conductive layer 202 and the conductive layer 208, in the manufacturing process of the display device 10, when forming the conductive layer 206 for forming the source wiring SL and the drain electrode, the damage to the oxide semiconductor layer 204 including the oxide semiconductor is alleviated. In addition, the source wiring SL includes the conductive layer 208 that is thicker than the thickness of the conductive layer 206 and the thickness of the oxide semiconductor layer 204, and can be used as a wiring for routing the conductive layer 208 in the display area 12. Therefore, the conductive layer 208 not only compensates for an increase in a resistance value of the source wiring SL caused by the fact that the conductive layer 206 is as thin as the film thickness of the oxide semiconductor layer 204, but also makes a resistance value of the source wiring SL of the conductive layer 208 smaller than a resistance value of the wiring formed using only the conductive layer 202 or the conductive layer 206. As a consequence, the display device 10 can reduce a delay caused by the resistivity of the source wiring SL.

Material of Each Member of Display Device 10 rigid substrate having a light transmitting property and no flexibility can be used for the array substrate 150 and the opposing substrate 152. For example, the rigid substrate having a light transmitting property and having no flexibility such as a glass substrate, a quartz substrate, a sapphire substrate, or the like can be used. In the case where the array substrate 150 and the opposing substrate 152 need to be flexible, the array substrate 150 and the opposing substrate 152 may be flexible substrates containing resin. For example, the flexible substrate containing resin such as a polyimide substrate, an acrylic substrate, a siloxane substrate, a fluorine resin substrate, or the like can be used. In addition, in order to improve heat resistance of the array substrate 150 and the opposing substrate 152, impurities may be introduced into the resin. Further, in the case where the display device 10 is applied to a transparent display or a large display, a glass substrate is preferably used as the array substrate 150 and the opposing substrate 152.

The first transparent substrate 151A and the second transparent substrate 151B are provided to protect the array substrate 150 and the opposing substrate 152. Thus, for example, the first transparent substrate 151A and the second transparent substrate 151B can be a light transmitting substrate. For example, the light transmitting substrate is a glass substrate, a plastic substrate, or the like.

For example, the gate insulating film 203, the insulating film 205, and the insulating film 209 may be formed of silicon nitride ($SiN_x$), silicon nitride oxide ($SiN_xO_y$), aluminum nitride ($AlN_x$), aluminum nitride oxide ($AlN_xO_y$), silicon oxide ($SiO_x$), silicon oxynitride ($SiO_xN_y$), aluminum oxide ($AlO_x$), aluminum oxynitride ($AlO_xN_y$), or the like. The gate insulating film 203, the insulating film 205, and the insulating film 209 may have a single layer structure using the material described above and may have a stacked layer structure using two or more of the materials. For example, as described in "Planer Layout and Cross-sectional Structure of Pixels", the gate insulating film 203 is formed of a stacked structure using the nitride insulating film 203a and the oxide insulating film 203b, and the insulating film 205 is formed of a stacked structure using the oxide insulating film 205a and the nitride insulating film 205b. For example, the nitride insulating film 203a, 205b and the insulating film 209 may be formed using silicon nitride. For example, a film containing silicon nitride is formed by a chemical vapor deposition method. Further, for example, silicon oxide can be used as a material for forming the oxide insulating films 203b and 205a.

$SiO_xN_y$ and $AlO_xN_y$ are silicon compounds and aluminum compounds that contain a smaller proportion of nitrogen (N) than oxygen (O) (x>y). In addition, $SiN_xO_y$ and $AlN_xO_y$ are silicon compounds and aluminum compounds that contain a smaller ratio of oxygen than nitrogen (x>y).

For example, an organic insulating material can be used as a material for forming the planarization film 207. For example, an organic insulating material such as a polyimide resin, an acrylic resin, an epoxy resin, a silicone resin, a fluorine resin, or a siloxane resin can be used.

As a material for forming the conductive layers 202 and 206 and the conductive layer 214, a general metal material can be used. For example, general metallic materials are aluminum (Al), titanium (Ti), chromium (Cr), cobalt (Co), nickel (Ni), molybdenum (Mo), hafnium (Hf), tantalum (Ta), tungsten (W), bismuth (Bi), silver (Ag), alloys or compounds thereof. The conductive layers 202, 206, and 208 and the conductive layer 214 may have a single layer structure using the materials described above, or may have a laminated structure using two or more of the materials. For example, the thickness of the conductive layer 202 is 250 nm or more and 350 nm or less, the conductive layer 202 of the display device 10 according to one embodiment of the present disclosure has a single layer configuration, and the thickness of the conductive layer 202 is 290 nm. For example, the conductive layer 206 is a titanium (Ti) single layer. Further, the film thickness of the conductive layer 206 is 50 nm or more and 100 nm or less, and the film thickness of the conductive layer 206 of the display device 10 according to one embodiment of the present disclosure is 100 nm. For example, the film thickness of the conductive layer 214 is 250 nm or more and 350 nm or less, and the film thickness of the conductive layer 214 of the display device 10 according to one embodiment of the present disclosure is 310 nm.

As a material for forming the first metal conductive layer 160, the second metal conductive layer 161, and the third metal conductive layer 162 included in the conductive layer 208, a metal material similar to the metal materials of the conductive layers 202 and 206 and the conductive layer 214 can be used. For example, titanium (Ti) may be used as a material for forming the first metal conductive layer 160 and the third metal conductive layer 162, and aluminum (Al) may be used as a material for forming the second metal conductive layer 161. For example, a film thickness of the first metal conductive layer 160 and a film thickness of the third metal conductive layer 162 are 50 nm or more and 100 nm or less, and the film thickness of the first metal conductive layer 160 and the film thickness of the third metal conductive layer 162 of the display device 10 according to one embodiment of the present disclosure are 100 nm. For example, thicknesses of the conductive layer 206 and the second metal conductive layer 161 are 300 nm or more and 500 nm or less, and the thicknesses of the conductive layer 206 and the second metal conductive layer 161 of the display device 10 according to one embodiment of the present disclosure is 350 nm.

As a material for forming the oxide semiconductor layer 204, an oxide semiconductor having characteristics of a semiconductor can be used. The oxide semiconductor layer 204 has a light transmitting property. For example, the oxide semiconductor layer 204 may be formed of an oxide semiconductor containing two or more metals including indium (In). For example, an oxide semiconductor including indium (In), gallium (Ga), zinc (Zn), and oxygen (O) may be used as the material for forming the oxide semiconductor layers 204. In particular, the oxide semiconductor layer 204 may be formed of an oxide semiconductor having In:Ga:Zn:O=1:1:1:4. In addition, the material for forming the oxide semiconductor layer 204 constituting the transistor Tr of the display device 10 is not limited to the oxide semiconductor having the composition ratio described above, and an oxide semiconductor having a composition ratio different from the composition ratio may be used. For example, the film thickness of the oxide semiconductor layer 204 is 30 nm or more and 110 nm or less, and the film thickness of the oxide semiconductor layer 204 of the display device 10 according to one embodiment of the present disclosure is 80 nm and is as thin as the conductive layer 206.

A transparent conductive film can be used as a material for forming the transparent conductive layer 212, the pixel electrode 216, and the common electrode 218. For example, the transparent conductive film is a mixture of indium oxide and tin oxide (ITO) and a mixture of indium oxide and zinc oxide (IZO). The transparent conductive film may be formed using a material other than the above. As a material for forming the light shielding layer 219 used for a black matrix BM, a black resin or a metallic material can be used. The black matrix BM is formed in contact with the common electrode 218 (see FIG. 7 and FIG. 8). The common electrode 218 formed of the transparent conductive film and the black matrix BM formed using the metal material can be laminated by forming the black matrix BM using a metal material. As a consequence, the black matrix BM can function as an auxiliary electrode for reducing electric resistivity loss of the common electrode 218. As the metallic material forming the black matrix BM, a material having reflectance lower than that of aluminum can be used. For example, the material having the reflectance lower than aluminum is chromium, molybdenum, titanium, or the like. The black matrix BM may have a single layer structure using the metal materials described above, or may have a laminated structure using two or more materials of the metal material. For example, a film thickness of the transparent conductive layer 212 and a film thickness of the pixel electrode 216 are 30 nm or more and 80 nm or less, and the film thickness of the transparent conductive layer 212 and the film thickness of the pixel electrode 216 according to one embodiment of the present disclosure are 60 nm.

For example, as described in "Outline of Display Device 10", the material forming the liquid crystal layer 210 is polymer dispersed liquid crystal. For example, the liquid crystal layer 210 may be formed using a polymer dispersed liquid crystal that increases the degree of scattering as a potential difference between the potential supplied to each pixel electrode 216 and the potential supplied to the common electrode 218 increases, or the liquid crystal layer 210 may be formed using a polymer dispersed liquid crystal that increases the degree of scattering as a potential difference between the potential supplied to each pixel electrode 216 and the potential supplied to the common electrode 218 decreases.

Various configurations of the display device exemplified as one of the embodiments of the present invention can be appropriately combined as long as they do not contradict each other. Moreover, various configurations of the display device exemplified as one of the embodiments of the present invention can be replaced as appropriate as long as they do not contradict each other. The addition, deletion, or design change of components as appropriate, or addition, omission or changes in conditions of a process by a person skilled in the art based on the display device disclosed in the present specification and the drawings are also included in the scope of the present invention as long as they are provided with the gist of the present disclosure.

It is understood that, even if the effect is different from those provided by each of the embodiments disclosed herein, the effect obvious from the description in the specification or easily predicted by a person skilled in the art is apparently derived from the present disclosure.

What is claimed is:

1. A display device comprising:

a first pixel including a transistor including an oxide semiconductor layer, a first gate wiring, and a first source wiring;

a first substrate;

a second pixel arranged alongside the first pixel in a second direction;

a first insulating film provided between a first conductive layer and a second conductive layer;

a second insulating film provided between a third conductive layer and both the second conductive layer and the oxide semiconductor layer;

a fourth conductive layer provided on the second insulating film;

a third insulating film provided on the fourth conductive layer;

a first transparent conductive layer including a pixel electrode included in the first pixel, in contact with the third insulating film, and arranged apart from the fourth conductive layer;

a second substrate provided opposite the first substrate; and a spacer provided on a first substrate side of the second substrate, wherein the first gate wiring includes a first part of the first conductive layer, and extends in a first direction, the first source wiring includes a first part of the second conductive layer and a first part of a third conductive layer connected to the first part of the second conductive layer, and extends in the second direction intersecting the first direction, and a thickness of the second conductive layer is thinner than a thickness of the first conductive layer and thinner than a thickness of the third conductive layer, the first substrate, the first conductive layer, the oxide semiconductor layer, the second conductive layer, and the third conductive layer are stacked in order along a third direction intersecting the first direction and the second direction, the oxide semiconductor layer overlaps a part of the first gate wiring in a plan view, the first source wiring contacts with a part of the oxide semiconductor layer and overlaps a part of the first gate wiring in a plan view, the second pixel includes a second gate wiring extending in the first direction and a second source wiring extending in the second direction, the second gate wiring includes a second part of the first conductive layer, the second source wiring includes a second part of the second conductive layer and a second part of the third conductive layer, the second gate wiring extends in the first direction and is arranged apart from the first gate wiring in the second direction in a plan view, the second source wiring is arranged to be parallel to the first source wiring along the second direction and overlaps the first gate wiring in a plan view, the first source wiring overlaps the second gate wiring in a plan view, in a plan view, in a first region where the second source wiring overlaps the first gate wiring, the second part of the second conductive layer and the first part of the second conductive layer overlap the first part of the first conductive layer, and the pixel electrode is electrically connected to the oxide semiconductor layer via a first contact hole provided in the third insulating film and a second contact hole provided in the second insulating film.

2. The display device according to claim 1, wherein the second conductive layer includes a single-layer structure, and the third conductive layer includes a first metal conductive layer, a second metal conductive layer provided on top of and in contact with the first metal conductive layer, and a third metal conductive layer provided on top of and in contact with the second metal conductive layer which are stacked in order from the second conductive layer along the third direction.

3. The display device according to claim 1, wherein the fourth conductive layer includes a first opening provided in a second region overlapping the first region, and the spacer is disposed inside the first opening.

4. The display device according to claim 3, wherein, in a plan view and in the first region, the second part of the second conductive layer is arranged apart from the second part of the third conductive layer, and the spacer overlaps the second part of the second conductive layer and the first part of the first conductive layer, and the spacer is spaced apart from the first part of the second conductive layer and the first part of the third conductive layer.

5. The display device according to claim 4, further comprising:

a light shielding layer provided on the second substrate;

a second transparent conductive layer provided in contact with the light shielding layer; and a fourth insulating film provided in contact with the second transparent conductive layer, wherein the fourth insulating film includes a second opening provided in a third region overlapping the second region, and the spacer is arranged inside the second opening and in contact with the second transparent conductive layer.

6. The display device according to claim 1, further comprising:

a liquid crystal layer provided between the first substrate and the second substrate; and a light source arranged so that light enters toward a side surface of the first substrate or a side surface of the second substrate.

7. The display device according to claim 6, wherein the liquid crystal layer includes a polymer-dispersed liquid crystal, when the polymer-dispersed liquid crystal is in a scattering state, an image is displayed in a display region where the first pixel and the second pixel overlap, and when the polymer-dispersed liquid crystal is in a non-scattering state, a background of the second substrate is visible from the first substrate, and a background of the first substrate is visible from the second substrate in the display region.

*    *    *    *    *